(12) United States Patent
Huggins

(10) Patent No.: US 8,701,650 B2
(45) Date of Patent: Apr. 22, 2014

(54) LIGHTWEIGHT, PORTABLE COOKING STOVE

(76) Inventor: Timothy Gregg Huggins, Dallas, TX (US)

( * ) Notice: Subject to any disclaimer, the term of this patent is extended or adjusted under 35 U.S.C. 154(b) by 637 days.

(21) Appl. No.: 12/553,046

(22) Filed: Sep. 2, 2009

(65) Prior Publication Data

US 2009/0314273 A1 Dec. 24, 2009

Related U.S. Application Data

(63) Continuation of application No. 11/761,483, filed on Jun. 12, 2007, now Pat. No. 7,600,510, which is a continuation-in-part of application No. 10/951,128, filed on Sep. 27, 2004, now Pat. No. 7,246,614.

(51) Int. Cl.
| | |
|---|---|
| *A47J 36/26* | (2006.01) |
| *A47J 33/00* | (2006.01) |
| *F24B 3/00* | (2006.01) |
| *F24C 9/00* | (2006.01) |

(52) U.S. Cl.
USPC ........ 126/25 R; 125/9 R; 125/9 B; 125/39 R; 125/40; 125/50; 125/29; 125/41 R; 99/449; 211/85.4

(58) Field of Classification Search
CPC ....... A47J 33/00; A47J 36/26; A47J 37/0763; A47J 37/07; F24B 3/00; F24C 9/00
USPC ... 126/9 R, 9 B, 25 R, 38, 39 R, 41 R, 40, 50, 126/43, 44; 99/449; 211/85.4
IPC ....... A47J 36/26, 33/00; F24B 3/00; F24C 9/00
See application file for complete search history.

(56) References Cited

U.S. PATENT DOCUMENTS

| | | | |
|---|---|---|---|
| 26,595 A | 12/1859 | Danner et al. | |
| 79,084 A | 6/1868 | Smallwood | |

(Continued)

FOREIGN PATENT DOCUMENTS

| | | | | |
|---|---|---|---|---|
| DE | 3402760 A1 | * | 8/1985 | ............ A47J 36/26 |
| FR | 2557271 A1 | * | 6/1985 | ............ A47J 36/30 |

(Continued)

OTHER PUBLICATIONS http://www.trangia.se, trangia_stoves_series 27-1, Trangia Corporate Website, Nov. 17, 2004.

(Continued)

*Primary Examiner* — Kang Hu
*Assistant Examiner* — Daniel E Namay
(74) *Attorney, Agent, or Firm* — Kirby B. Drake; Klemchuk Kubasta LLP

(57) ABSTRACT

A small, lightweight, portable cooking stove that utilizes alcohol as fuel and is suitable for backpacking, hunting, camping and similar activities. The cooking stove includes a combustion chamber which encloses, contains and regulates the entire combustion process. The stove also includes an efficient fuel vaporizer, which is adapted to perform in unison with the combustion chamber, to effect the metered and efficient mixing of the air and fuel vapor. An integral, simple and convenient means is provided to vary the intensity and pattern of the heat output, thereby controlling the cooking performance of the stove. The stove achieves high heat output and efficiency, low fuel consumption, and superior cooking performance in a small, lightweight, portable, convenient, simple and integrated assembly.

14 Claims, 17 Drawing Sheets

(56) References Cited

U.S. PATENT DOCUMENTS

| | | | |
|---|---|---|---|
| 199,531 A * | 1/1878 | Freeman | 126/45 |
| 243,315 A * | 6/1881 | Seyler | 126/25 R |
| 299,713 A * | 6/1884 | Babbit et al. | 126/29 |
| 500,765 A | 7/1893 | Heller | |
| 546,632 A | 9/1895 | Wojidkow | |
| 560,319 A | 5/1896 | Mast | |
| 695,979 A * | 3/1902 | Widmer | 126/38 |
| 766,618 A | 8/1904 | Heinrichs | |
| 875,216 A * | 12/1907 | Ruhmann | 126/29 |
| 855,356 A | 4/1908 | Miller | |
| 893,559 A | 7/1908 | Yates | |
| 915,239 A | 3/1909 | Stapp | |
| 936,482 A * | 10/1909 | Sheeley | 126/43 |
| 1,135,317 A | 4/1915 | Patterson | |
| 1,194,131 A * | 8/1916 | Brown | 126/29 |
| 1,210,099 A | 12/1916 | Pohl | |
| 1,221,514 A | 4/1917 | Crain | |
| 1,298,762 A * | 4/1919 | Milligan | 126/25 R |
| 1,353,265 A | 9/1920 | Heikichi | |
| 1,373,828 A | 4/1921 | Nottingham | |
| 1,421,209 A * | 6/1922 | Gehrer | 431/249 |
| 1,437,073 A * | 11/1922 | Popper | 126/43 |
| 1,437,739 A | 12/1922 | Vernon | |
| 1,437,812 A | 12/1922 | MacMillan | |
| 1,467,754 A * | 9/1923 | Roemer | 126/152 R |
| 1,467,815 A * | 9/1923 | Campbell | 126/59 |
| 1,487,474 A * | 3/1924 | Rhodes | 126/38 |
| 1,508,334 A | 9/1924 | Ingalls | |
| 1,592,729 A | 7/1926 | Feist | |
| 2,014,931 A | 9/1935 | Genovar | |
| 2,080,592 A | 5/1937 | Zickler | |
| 2,088,797 A | 8/1937 | Larsen | |
| 2,154,305 A * | 4/1939 | Goerl | 126/38 |
| 2,174,824 A * | 10/1939 | Frank | 126/266 |
| 2,381,906 A * | 8/1945 | Howard | 126/9 R |
| 2,488,014 A | 11/1949 | Higman | |
| 2,502,434 A * | 4/1950 | Creitz | 126/266 |
| 2,530,721 A * | 11/1950 | Perlman | 126/43 |
| 2,573,211 A | 10/1951 | Manzler | |
| 2,681,056 A | 6/1954 | Fischl | |
| 2,756,738 A * | 7/1956 | Kratz | 126/9 R |
| 2,797,298 A | 6/1957 | Shiro | |
| 2,842,116 A | 7/1958 | Hinderer | |
| 2,877,759 A | 3/1959 | Giese | |
| 3,057,399 A | 10/1962 | Vant | |
| 3,146,773 A | 9/1964 | Mezler | |
| 3,151,621 A | 10/1964 | Jackson | |
| 3,315,723 A | 4/1967 | Snodgrass et al. | |
| 3,316,957 A * | 5/1967 | Stockli et al. | 431/203 |
| 3,331,365 A | 7/1967 | Sussan | |
| 3,336,847 A | 8/1967 | Eugene | |
| 3,359,963 A * | 12/1967 | Kostial | 126/9 R |
| 3,371,659 A | 3/1968 | Paspalas | |
| 3,381,678 A | 5/1968 | Fry | |
| 3,430,621 A * | 3/1969 | Doty | 126/25 R |
| 3,566,857 A | 3/1971 | Price | |
| 3,574,505 A | 4/1971 | Kimball | |
| 3,658,049 A | 4/1972 | Gerber | |
| 3,726,268 A | 4/1973 | Stansell | |
| 3,874,362 A * | 4/1975 | Kapustin | 126/67 |
| 3,960,134 A | 6/1976 | Scott | |
| 4,164,930 A | 8/1979 | Johnston | |
| 4,282,854 A * | 8/1981 | Byars | 126/25 B |
| 4,461,270 A * | 7/1984 | Sutter | 126/25 B |
| 4,508,094 A | 4/1985 | Hait | |
| 4,539,973 A | 9/1985 | Hait | |
| 4,604,053 A | 8/1986 | De la Rosa | |
| 4,604,986 A | 8/1986 | Barnes | |
| 4,722,322 A * | 2/1988 | Varney et al. | 126/261 |
| 4,762,114 A * | 8/1988 | Blankemeyer | 126/373.1 |
| 4,793,321 A * | 12/1988 | Rafford et al. | 126/43 |
| 4,905,659 A * | 3/1990 | Armistead | 126/9 R |
| 4,909,235 A | 3/1990 | Boetcker | |
| 4,915,091 A | 4/1990 | Varney | |
| 5,163,415 A | 11/1992 | Moncrief | |
| 5,203,316 A | 4/1993 | Pritchett | |
| 5,284,126 A * | 2/1994 | Varney | 126/50 |
| 5,363,977 A * | 11/1994 | Hoff | 220/4.27 |
| 5,373,863 A | 12/1994 | Prizio | |
| 5,471,783 A | 12/1995 | McLean | |
| 5,528,982 A * | 6/1996 | Chuang | 99/446 |
| 5,842,463 A | 12/1998 | Hall | |
| 5,881,709 A | 3/1999 | Daoust | |
| 5,915,371 A * | 6/1999 | Hering | 126/9 R |
| 5,979,428 A | 11/1999 | Greene, Jr. | |
| 6,213,115 B1 | 4/2001 | Anderson et al. | |
| 6,488,023 B2 | 12/2002 | Pecoskie | |
| 7,107,983 B1 | 9/2006 | West | |
| 7,246,614 B2 * | 7/2007 | Huggins | 126/44 |
| 7,600,510 B2 * | 10/2009 | Huggins | 126/44 |
| 2001/0035178 A1 * | 11/2001 | Pecoskie | 126/44 |
| 2004/0128880 A1 | 7/2004 | Abe | |
| 2004/0238089 A1 | 12/2004 | Li et al. | |
| 2005/0217657 A1 | 10/2005 | Anue | |
| 2005/0274372 A1 | 12/2005 | Knight | |
| 2006/0065264 A1 * | 3/2006 | Huggins | 126/43 |
| 2007/0039603 A1 * | 2/2007 | Lindsly et al. | 126/38 |
| 2007/0227523 A1 * | 10/2007 | Huggins | 126/25 R |
| 2009/0314273 A1 * | 12/2009 | Huggins | 126/44 |
| 2009/0314274 A1 * | 12/2009 | Huggins | 126/44 |

FOREIGN PATENT DOCUMENTS

| | | | |
|---|---|---|---|
| GB | 232182 | 6/1925 | |
| GB | 527286 | 10/1940 | |
| GB | 2227077 A | 8/1990 | |
| JP | 55035879 A * | 3/1980 | F23B 3/00 |
| WO | 9921465 A1 | 5/1999 | |
| WO | WO 9932022 A1 * | 7/1999 | A47J 33/00 |

OTHER PUBLICATIONS http://www.en.wikiedia.org/wiki/soda_can_stove, Soda Can Stove, Wikipedia Web Site, Dec. 20, 2004.

* cited by examiner

LIGHTWEIGHT, PORTABLE COOKING STOVE

CROSS-REFERENCE TO RELATED APPLICATION

This application is a continuation patent application of application Ser. No. 11/761,483 filed Jun. 12, 2007 now U.S. Pat. No. 7,600,510, currently allowed, which was a continuation-in-part of application Ser. No. 10/951,128 filed Sep. 27, 2004, which issued on Jul. 24, 2007 as U.S. Pat. No. 7,246,614, the entire contents of which are incorporated herein by reference.

BACKGROUND AND SUMMARY OF THE INVENTION

1. Technical Field

The invention is a small, lightweight, portable cooking stove that uses alcohol as fuel.

2. Prior Art

Portable cooking stoves designed to use alcohol as a fuel are well known to prior art. These are used by hikers, campers, backpackers, hunters and others who have a need to boil water or cook a hot meal in remote locations or primitive conditions. As a fuel, alcohol has various advantages over petroleum based fuels. Alcohol is widely available, inexpensive, convenient, relatively innocuous and easy to handle. It can be readily repackaged and safely carried in lightweight plastic bottles. Alcohol stoves are typically smaller and lighter than petroleum-fueled stoves. Alcohol stoves are typically also very simple, reliable and easy to use, and have few, if any, moving parts. Because of these advantages, alcohol-fueled stoves are very popular in many parts of the world. However, in the United States they have had limited popularity. This limited popularity is primarily due to two factors.

The first factor that has limited the popularity of alcohol-fueled stoves in the United States is their overall poor performance. Under the best conditions, the heat output from these stoves is marginal. In real outdoor conditions of wind and weather, these stoves rapidly become incapable of cooking a meal. These stoves demonstrate a variety of forms and features that cause inefficient performance and wasted heat. The overall inefficient performance of alcohol stoves known to prior art also causes an excessive consumption of fuel. This is undesirable both due to the increased cost of operating the stove, as well as the increased weight of fuel that must be carried.

The second factor that has limited the popularity of alcohol-fueled stoves in the United States is the inability to effectively adjust the heat output of the stove. Often these stoves provide no manner of heat adjustment. When they do, it is commonly effected by means of some type of snuffer in the form of a partial lid, cap or cover that is positioned in such a way that partially interferes with or throttles the flame. This method of adjusting the heat output has several disadvantages. Positioning or adjusting of the snuffer can be a rather awkward undertaking and requires removing the cooking pot or reaching under it. This presents a danger of burning or scalding. Often the cooking pot must be completely removed from the stove and set aside while positioning the snuffer. Obstructing the flame in this way tends to produce a small hot spot on the bottom of the cooking pan and prevents the even distribution of heat for thorough and rapid cooking.

In summation, the two primary factors that have limited the popularity of alcohol stoves in the United States are their overall poor performance and the inconvenience with which the heat adjustment is effected. Similarly, petroleum-fueled stoves enjoy a broad popularity primarily due to their advantages of high heat output and the ability to adjust this heat output for control of the cooking process. These advantages are generally viewed as outweighing their numerous disadvantages. The disadvantages include the need for bulky and heavy metal fuel containers, high operating cost, poor operation in wind or cold weather, need to constantly tend them during cooking, odor, danger of fuel spills, complexity, poor reliability, the need to carry maintenance kits, and the possibility of dangerous flare-ups when lighting the stove. In light of these numerous disadvantages, the importance of high heat output and adjustable cooking performance in determining the overall utility and popularity of a stove is clearly seen.

SUMMARY IF THE CURRENT INVENTION

The current invention seeks to achieve a variety of improvements over the portable cooking stoves which are known to prior art. The current invention is conceived and designed with the intent of achieving specific objectives for enhanced performance and convenience over the prior art.

It is an objective of this invention to achieve a high heat output and stable cooking performance suitable for fast and effective cooking in a variety of outdoor conditions of wind and weather—attaining overall cooking performance which consistently meets or exceeds the performance of petroleum-fueled stoves.

It is a further objective of this invention to achieve a high fuel efficiency, in order to minimize operating costs and the weight of fuel that must be carried.

It is a further objective of this invention to provide a convenient and simple means for adjusting the heat output of the stove to effectively control the cooking process.

It is a further objective of this invention to be small, lightweight and conveniently portable. When packed with a fuel bottle, the entire stove shall be of a size that can be held in the palm of the hand and weigh only a few ounces. The entire invention is rendered conveniently portable in a sturdy and compact package.

It is a further objective of this invention to be largely trouble free, simple, reliable and easy to use.

It is a further objective of this invention that it will cool quickly so that it can be handled and stowed soon after use.

To achieve the above listed objectives, a portable cooking stove is described wherein the several components of the stove are adapted to perform together as an integrated unit—all components being engineered to operate in balanced synergy to maximize the overall performance and utility of the stove. The several components of the stove are adapted to work in concert to optimize as far as practicable the various fluidic, thermodynamic and heat transfer processes of the stove in a manner that is both unobvious and unknown to prior art.

Combustion Chamber

Stoves known to the prior art are typically intended to effect the combustion process in the open air. Because the combustion process takes place in the open air, there is no means for controlling the quantity of air in contact with the combustion process. This produces a condition known in the field of thermodynamics as "excess air". The condition of excess air occurs when a combustion process is provided with more air than is required for the complete combustion of the fuel. This excess air removes heat from the combustion process, thereby reducing the efficiency of the combustion process.

The importance and benefits of providing a combustion chamber to create a controlled volume wherein the entire combustion process can be enclosed, contained and encompassed in order to maximize the heat output of a cooking stove are well known and detailed in prior art. U.S. Pat. Nos. 5,915,371 and 5,842,463 both describe the functioning and the performance benefits derived from the use of a combustion chamber to maximize the heat output of a cooking stove. These inventions even describe a means for adjusting the draft to alter the airflow through the combustion chamber, thereby varying the heat output and adapting to various cooking requirements.

These inventions describe combustion chambers that are intended to be used primarily with solid fuel, such as wood or charcoal. They are adapted to address the specific problems associated with the combustion of such solid fuels. These inventions are not engineered nor adapted to meter and direct the flow of combustion air to efficiently mix with and effect the combustion of a vaporized fuel. These prior inventions do not conceive of the combustion chamber as integral with a specific combustion source, such that both components might be optimized and adapted to operate in balanced synergy. The cooking stove of the current invention incorporates a combustion chamber that is specifically engineered and adapted as a component within an integrated assembly, to meter and direct the flow of combustion air such that it efficiently mixes with and effects the combustion of a vaporized fuel.

The portable, alcohol-fueled cooking stove of the current invention comprises a combustion chamber which is engineered and adapted to create a controlled volume wherein the entire combustion process can be enclosed, contained and encompassed. The purpose of this combustion chamber is to meter, regulate and control the flow of combustion air, as well as facilitating and promoting the mixing of the combustion air with the vaporized fuel. The combustion chamber is adapted to specifically meter and direct the flow of combustion air so as to maintain the stoichiometric ratio with a given quantity of fuel and optimize the efficiency of the combustion process.

Alcohol-fueled stoves known to prior art may optionally employ a windscreen which may encompass the stove to a greater or lesser extent. However, these windscreens are, by design, description and intent, adapted only to shield the stove from the deleterious effects of crosswinds. Unlike a true combustion chamber, these windscreens are not engineered, adapted nor intended to create a controlled volume wherein the entire combustion process can be contained, regulated and optimized. The prior art does not consider these windscreens to be an integral part of the stove. The prior art consistently refers to these windscreens as ancillary components, being separate from the stove proper—an optional piece to be employed as required to shelter the stove. These windscreens are not intended to be fundamental to the operation of the stove and are not adapted to specifically meter and direct the flow of combustion air so as to optimize the efficiency and control the combustion process.

Fuel Vaporizer

Whereas the combustion chamber is designed to effectively meter and control the flow of combustion air, the efficient operation of the stove also relies on the effective generation and distribution of fuel vapor. The respective volumes of the combustion air and the fuel vapor must be adapted to alternately achieve a stoichiometric ratio of air to fuel for maximum combustion efficiency, or a rarified ratio of air to fuel for reduced heat output and control over the cooking process.

In order for alcohol fuel to burn, the liquid must be converted into a vapor. Consequently, all alcohol-fueled stoves employ some means by which the liquid alcohol fuel can be vaporized. This typically takes the form of some manner of vessel containing liquid alcohol fuel which is caused to be heated and thereby be converted to vapor. Alternately, some form of wick is used to effect the vaporization of the fuel. The efficiency and rate at which the liquid fuel can be vaporized directly affects both the fuel consumption and the heat output of the stove. Stoves known to prior art do not effect the fuel vaporizing process efficiently and demonstrate excessive thermal losses. These excessive thermal losses serve to both reduce the heat output of the stove, as well as increase the fuel consumption.

The inefficiency of the fuel vaporizing process of stoves known to prior art is caused by several factors. These fuel vaporizing devices typically incorporate an excessive external surface area, both as a consequence of their physical size and dimensions, as well as the deliberate application of fins, ribs or other heat transferring features. This excessive surface area causes the loss of heat to the environment primarily through convection. These fuel vaporizing devices typically incorporate an excessive mass as a consequence of their physical size and dimensions, as well as deliberate application of additional mass. This excessive mass causes the loss of heat to the thermal mass of the fuel vaporizing device. These deliberate applications of excessive surface area and excessive mass result from an improper understanding of the physical processes involved in the fuel vaporization. U.S. Pat. No. 4,164,930 clearly illustrates both of these impediments applied to prior art.

Many stoves known to prior art use some form of wick. The employment of a wick significantly circumscribes the performance of the fuel vaporizer. The limited capacity of the wicking process, combined with both the mass and volume of the wick material, render the use of a wick unsuitable where high heat output, small size and light weight are all required.

In addition to incorporating forms and features that are conducive to the excess loss of heat, stoves known to prior art typically do not employ an effective means for mixing the vaporized fuel thoroughly with the combustion air. If the fuel vapor and combustion air are not thoroughly mixed in the proper area beneath the cooking pot, unburned fuel vapor will escape and both the temperature and efficiency of the combustion process will be reduced. To effectively mix the combustion air and fuel vapor it is necessary to induce turbulence in one or both of the fluids. For maximum combustion efficiency, this turbulence must be created at the confluence of the two fluid flows.

The portable, alcohol-fueled cooking stove of the current invention comprises a fuel vaporizer which is engineered and adapted to minimize the heat lost through the external surface area and mass as far as practicable while maintaining the utility of the stove.

The volume of the vessel is specifically adapted to hold approximately two U.S. fluid ounces of fuel. This is the optimal fuel capacity of the fuel vaporizer. This limited volume enables the fuel vaporizer to have minimal size and dimensions. This minimal size and dimensions reduce as far as practicable both the thermal mass and external surface area of the fuel vaporizer. This minimizes the heat which is lost to the thermal mass and the external surface area of the fuel vaporizer, and provides the maximum amount of energy available to effect the vaporization of the liquid fuel. At the same time two U.S. fluid ounces of fuel provides fuel sufficient enough to cook a typical meal for two people. By holding no more fuel than is required to cook a meal, the thermal mass of the fuel is also minimized. This minimal fuel volume and thermal mass reduces as far as practicable the heat lost to the thermal mass of the fuel. Consequently, the optimized size and dimensions of the fuel vaporizer enable complete utility of the stove while minimizing heat loss.

The fuel vaporizer is also designed to accelerate the flow of the fuel vapor to induce a turbulent flow. By throttling the expanding vapor through an array of small orifices, jets of vapor are ejected from the fuel vaporizer. These jets are positioned and located so as to be injected directly into the convective flow of the combustion air. This maximizes the interaction and mixing between the combustion air and the fuel vapor and creates a very efficient diffusion flame.

Adjustable Heat Output

In addition to achieving a high efficiency with the consequent advantages of high, stable heat output and low fuel consumption, the current invention also incorporates a means for simply and conveniently adjusting the heat output to achieve effective and precise control over the cooking process. This heat adjustment is achieved by metering and controlling the flow of combustion air within the combustion chamber. The flow of combustion air is controlled both in volume and location within the combustion chamber.

The ability to control the cooking process by adjusting the heat output of a stove is a primary attribute that defines the utility, convenience and desirability of the stove. Without the facility for effectively adjusting the heat output, a stove is of limited utility and largely unsuitable for cooking. Petroleum-fueled stoves effect the heat adjustment by directly throttling the fuel flow. This in turn reduces the quantity of combustion air which is entrained by the fuel flow.

Alcohol-fueled stoves known to prior art often incorporate no means at all for adjusting the heat output. Those stoves which do provide a heat adjustment typically employ some type of snuffer in the form of a partial lid, cap or cover that is positioned in such a way to obstruct or interfere with the flow of fuel vapor as it escapes from the fuel vaporizer. This method of adjusting the heat output has several disadvantages. Positioning or adjustment of the snuffer can be a rather awkward undertaking and requires removing the cooking pot or reaching under it. This presents a danger of burning or scalding. Often the cooking pot must be completely removed from the stove and set aside while placing the snuffer. Obstructing the flame in this way also tends to produce a small hot spot on the bottom of the cooking pan and prevents the even distribution of heat for thorough and rapid cooking.

The portable, alcohol-fueled cooking stove of the current invention incorporates a practical, convenient, safe and simple mechanism for regulating the heat output of the stove. This mechanism is quick and easy to operate, and it achieves an effective control of the cooking process. This mechanism is integral with the stove and readily accessible on the outside of the stove. The heat output of the stove can be precisely adjusted without removing the cooking pot or risking burns, scalds or other mishaps.

This adjustment of the heat output is effected by metering and controlling the flow of combustion air both in volume and in location. This metering and controlling of the combustion air flow modulates the combustion process which is in contact with the fuel vaporizer, enabling the temperature of the fuel vaporizer to be regulated. That is, by reducing the volume and redirecting the location of the combustion air within the combustion chamber the fuel vaporizer can be caused to be cooled. As the fuel vaporizer is cooled, it generates less fuel vapor. This reduced flow of fuel vapor, being conditioned by and adapted to the reduced and redirected flow of combustion air, produces a lower overall heat output for the stove. This means of reducing the flow of fuel vapor, in concert with the reduced and redirected flow of the combustion air, allows an effective, convenient and precise control of the cooking process. This means of controlling the heat output also spreads the heat very evenly throughout the top portion of the combustion chamber and around the bottom and the sides of the cooking pot, enabling foods to be cooked quickly and thoroughly without hot spots or burning.

Portability

In addition to the improvements in the heat output, efficiency, utility and convenience of the current invention, it is also adapted to be small, lightweight and easily portable. The various components are engineered as an integrated unit not only to facilitate the operation of the stove, but also to facilitate its portability and storage.

An important measure of the utility of a backpacking stove is how lightweight, simple and convenient it is to carry. Stoves known to prior art may typically consist of a half-dozen or more parts, with little thought given to their packaging. This can render them bulky and difficult to carry, with the potential for lost or damaged parts and added complexity of setup.

All the components of the current invention nest together when packed, forming a single, compact unit in the shape of a hollow cylinder. This cylinder is proportioned to also contain a fuel bottle, whereby the entire invention is rendered conveniently portable in a sturdy and compact package that weighs only a few ounces and can be comfortably held in the palm of the hand. This package is so efficient that when the fuel bottle is filled with fuel, less than ten percent of the package contains empty space. Being so contained in a single, integrated unit, all of the components are protected from loss or damage, and the stove can be quickly unpacked and set up for use.

BRIEF DESCRIPTION OF THE DRAWINGS

A more complete understanding of the present invention may be had by reference to the following Detailed Description when taken in connection with the accompanying Drawings, wherein.

N.B.: The material thicknesses of components shown in section in these drawings are approximately ten-thousandths of one inch. Consequently, the section thicknesses are shown in slightly exaggerated scale to identify the sections.

DETAILED DESCRIPTION

Figure 1:
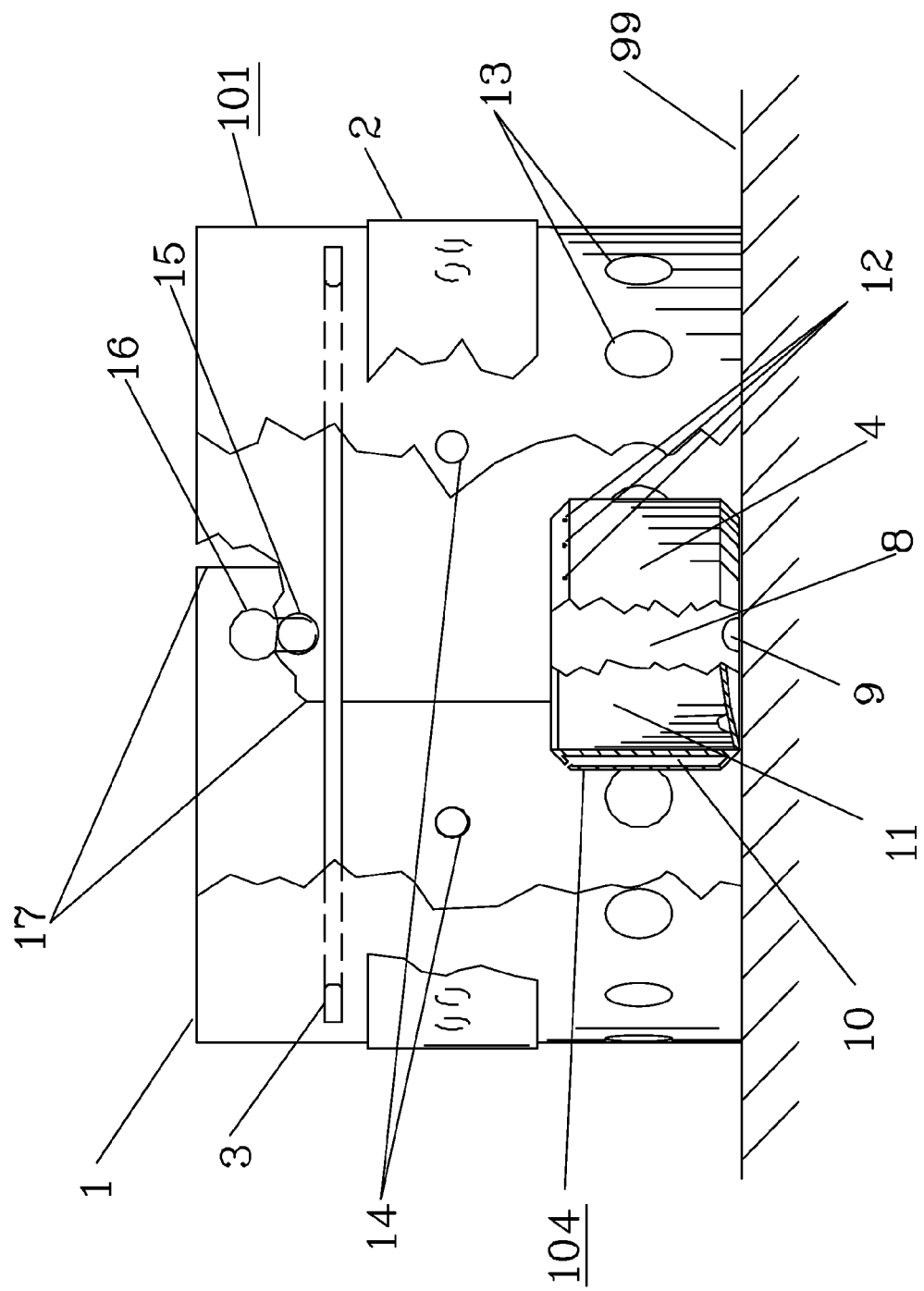
FIG. 1 shows the preferred embodiment in a cutaway, elevation view of the assembled stove.
Figure 2:
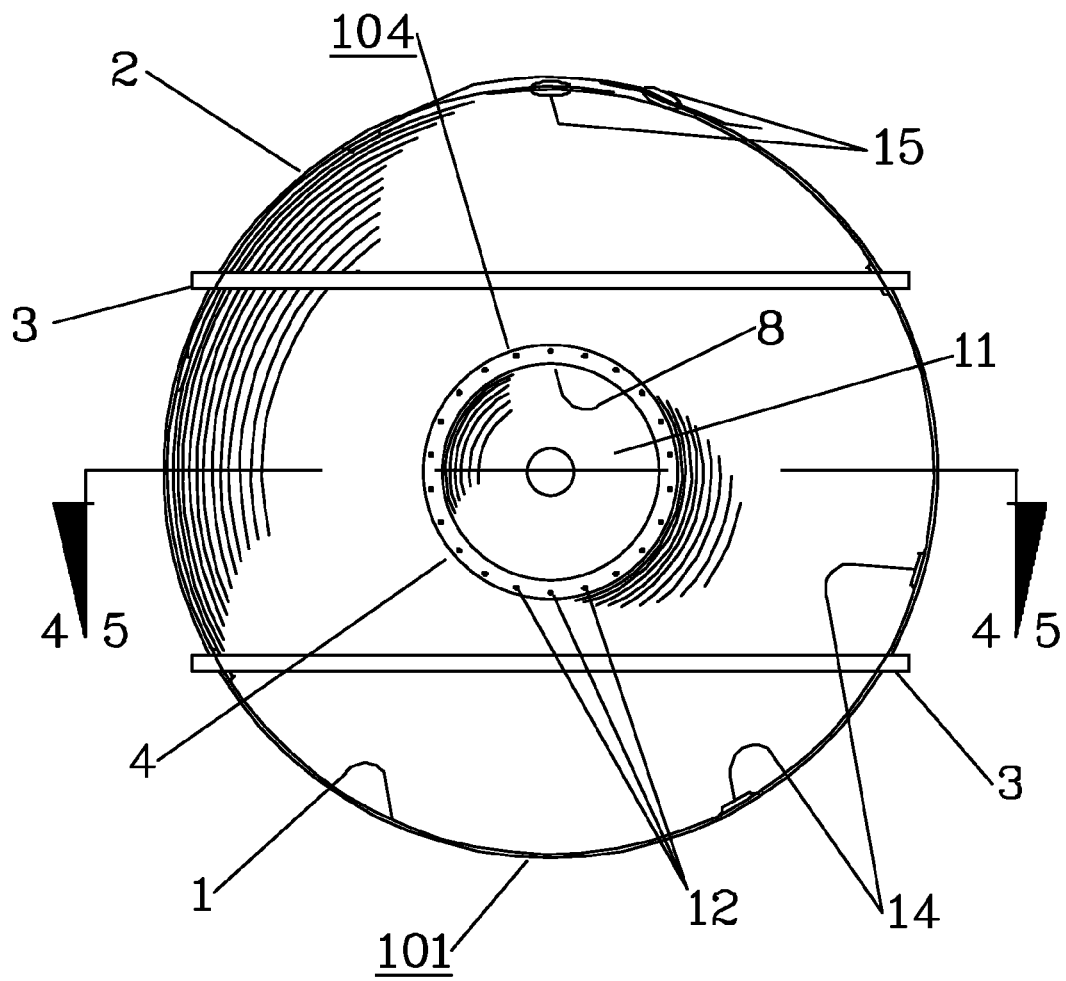
FIG. 2 shows the preferred embodiment in a plan view of the assembled stove.
Figure 3:
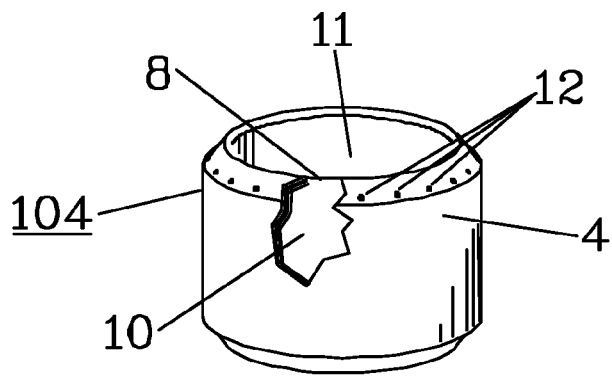
FIG. 3 shows the preferred embodiment of the fuel vaporizer in a perspective view.

FIG. 1 shows a cutaway, elevation view of the preferred embodiment of the assembled stove. FIG. 2 shows a plan view of the preferred embodiment of the assembled stove. FIG. 3 shows a perspective view of the preferred embodiment of the fuel vaporizer.

The preferred embodiment of the current invention includes a combustion chamber 101 which comprises a cylindrical wall 1 approximately six inches in diameter and four inches in height. This cylindrical wall 1 is formed from a thin sheet of aluminum, approximately ten-thousandths of one inch thick, being rolled into a cylinder and attached together at the ends 17. The ends 17 are attached by means of rivets 15 that slide into keyhole slots 16. The combustion chamber 101 is intended to alternately sit upon a base or a supporting surface 99 such that the bottom of the combustion chamber is fully closed and sealed off from the air.

The combustion chamber cylindrical wall 1 is perforated by a plurality of circular ports 13 and 14. These ports 13 and 14 admit combustion air into the combustion chamber 101 and meter and direct the flow of this combustion air. These ports 13 and 14 which perforate the combustion chamber wall 1 are arrayed in two sets.

The first set of ports 13 which perforates the combustion chamber wall 1 is the primary set of air metering ports 13. There are eighteen ports in the primary set of air metering ports 13. Each of the eighteen ports in the primary set 13 is one-half inch in diameter. All of the ports of the primary set 13 are coplanar and are arrayed angularly about the combustion chamber cylindrical wall 1, being located approximately one-half inch above the bottom edge of the combustion chamber 101. Under the influence of the natural convection currents resulting from the combustion process, the primary set of ports 13 is adapted to meter the appropriate volume of air to form a stoichiometric ratio with a specific quantity of fuel vapor. The locations and positions of the primary air metering ports 13 are adapted to provide a controlled and directed flow of combustion air to efficiently mix with and effect the combustion of the fuel vapor.

The second set of ports 14 which perforates the combustion chamber wall 1 is the secondary set of air metering ports 14. There are six ports in the secondary set of air metering ports 14. Each of the six ports in the secondary set 14 is one-quarter inch in diameter. All of the ports of the secondary set are coplanar and arrayed angularly about the combustion chamber cylindrical wall 1, being located approximately two and one-quarter inches above the bottom of the combustion chamber 101. The ports of the secondary set 14 are intended to throttle and restrict the flow of air into the combustion chamber, thereby rarifying the quantity of combustion air within the combustion chamber.

The combustion chamber 101 includes an obturating device 2 whereby alternately either the primary set of air metering ports 13, or the secondary set of air metering ports 14 may be blocked off in part or in whole. By alternately blocking either the primary set 13 or the secondary set 14 of air metering ports, both the volume and the flow patterns of the combustion air within the combustion chamber can be regulated and controlled. By controlling both the volume and flow patterns of the combustion air, the heat output and cooking performance of the stove can be controlled and adjusted.

The obturating device 2 consists of a thin, strong, flexible strip of aluminum approximately ten-thousandths of one inch thick and one and one-quarter inches wide. This aluminum strip is formed into a cylindrical band by attaching the ends of the strip together. The ends of the strip are attached by means of a rivet 15 that slides into a keyhole slot. The cylindrical obturating band 2 thus formed has an inside diameter adapted to fit over the outside diameter of the combustion chamber cylindrical wall 1. The diameter of the obturating band 2 is adapted to fit securely over the combustion chamber cylindrical wall 1, while being loose enough to be readily slid over the combustion chamber cylindrical wall 1.

The combustion chamber 101 includes a means for supporting a cooking pot 7. This pot supporting device comprises two steel rods 3, each rod 3 being approximately five and one-half inches long and one-eighth inch in diameter. Both ends of each rod 3 pass through the combustion chamber cylindrical wall 1 and are supported by the cylindrical wall 1. The rods 3 are arranged parallel and coplanar, being spaced approximately three inches apart. Being so arranged, the rods 3 form a rudimentary grillage upon which a cooking pot 7 may be supported. This grillage is positioned approximately one inch down from the top of the combustion chamber 101.

In conjunction with the combustion chamber 101, the stove comprises a fuel vaporizer 104 such that the combustion chamber 101 and fuel vaporizer 104 are engineered and adapted as an integrated unit—operating in balanced synergy to effect a high heat output and fuel efficiency by maintaining a stoichiometric ratio between the combustion air and fuel.

The fuel vaporizer 104 comprises a vessel fabricated from aluminum in the shape of a shallow, cylindrical cup 4. This shallow, cylindrical, cup-shaped, aluminum vessel 4 is approximately two inches in diameter and is adapted to hold approximately two U.S. fluid ounces of fuel.

This shallow, cylindrical cup 4 includes a double wall 8. By means of this double wall 8 the interior volume of the shallow, cylindrical cup 4 is divided into two chambers 10 and 11. The first chamber is an inner chamber 11. The inner chamber 11 forms a cylinder whose diameter is defined by the inside diameter of the double wall 8. This cylindrical, inner chamber 11 is coaxial and concentric with the shallow, cylindrical cup 4. The second chamber is an outer chamber 10. The outer chamber 10 is annular in form, this annulus being formed by the gap between the outer wall of the combustion chamber 101 and the double wall 8. The outer, annular chamber 10 fully encircles the inner cylindrical chamber 11. Said chambers are separated each from the other by the double wall 8. The chambers have some connection and may enjoy limited intercourse by means of a plurality of small ports 9 at the base of the double wall 8.

The inner, cylindrical chamber 11 has a diameter that is at least eighty percent of the overall diameter of the fuel vaporizer 104. This maximizes, as far as is practicable while maintaining the utility of the stove, the outside surface area of the inner, cylindrical chamber 11. This also minimizes, as far as is practicable while maintaining the utility of the stove, the thickness of the outer, annular chamber 10. These factors work together to maximize the rate of heat transfer and the efficiency of heat transfer between the inner, cylindrical chamber 11 and the outer, annular chamber 10.

The inner, cylindrical chamber 11 of the fuel vaporizer 104 is uncovered at the top, thereby forming an open chamber. The contents of this open, inner chamber 11 may freely communicate with the air. The outer, annular chamber 10 is covered at the top, thereby forming a closed chamber. This closure is interrupted only by a plurality of small orifices 12. There are approximately twenty two of these orifices 12 arrayed in a circular pattern. These orifices 12 are approximately twenty eight-thousandths of one inch in diameter. The diameter of the circular pattern of these orifices 12 is approximately one-eighth of an inch smaller than the overall diameter of the fuel vaporizer 104.

Figure 4:
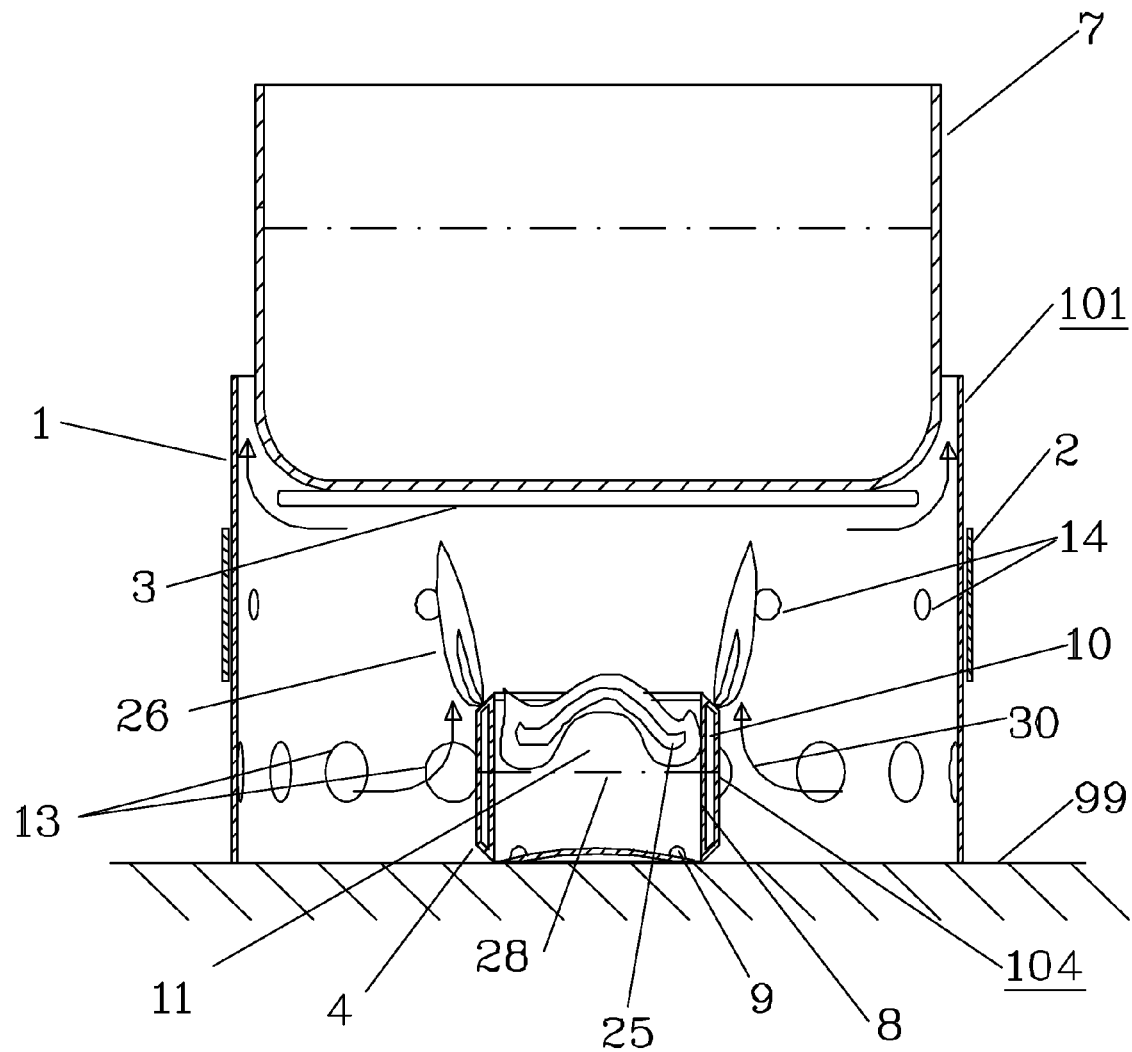
FIG. 4 shows the preferred embodiment in sectional elevation with the stove in use and configured to produce maximum heat output.

FIG. 4 shows a section through the elevation view of the stove as it is set up for cooking use and configured for maximum heat output. A cooking pot 7 is shown placed upon the stove, being supported by the pot supporting rods 3. The cooking pot 7 has an outer diameter which is somewhat smaller than the inner diameter of the combustion chamber 101 such that the cooking pot 7 is able to fit inside the combustion chamber 101. The diameter of the cooking pot 7 is approximately five and five-eighths inches. When the cooking pot 7 is seated upon the pot supporting rods 3 and located within the top of the combustion chamber 101, the top of the combustion chamber 101 is, for most of its area, obstructed and closed off by the cooking pot 7. The only opening of the top of the combustion chamber 101 is an annular gap which exists between the cooking pot 7 and the combustion chamber wall 1. This annular gap has a width of about three-sixteenths of one inch. This annular gap acts as a flue and accelerates the combustion gases out of the top of the combustion chamber 101. This greatly facilitates and strengthens the natural convection process that draws air into the combustion chamber through the air metering ports 13 and 14. This annular gap also increases the transfer of heat from the combustion gases to the cooking pot 7. As the combustion gases are accelerated through the annular gap, they give up heat to the cooking pot 7 as defined by the Bernoulli Principle.

With the stove set up as shown in FIG. 4, the combustion chamber 101 creates a controlled volume wherein the entire combustion process can be enclosed, contained and encompassed. The combustion chamber 101 is placed upon some supporting surface or suitable base 99 such that the bottom of the combustion chamber 101 is fully closed off from intruding airflow. The obturating band 2 of the combustion chamber 101 is positioned to fully expose the primary set of air metering ports 13, thereby occluding the secondary set of air metering ports 14. Alcohol fuel 28 is poured into the inner, cylindrical chamber 11 of the fuel vaporizer 104. By means of the plurality of small ports 9 at the base of the double wall 8, the fuel flows into the outer, annular chamber 10 and seeks a common level within the inner chamber 11 and outer chamber 10. The fuel vaporizer 104 is placed in the center of the combustion chamber 101, being set upon the same supporting surface or suitable base 99 that supports the combustion chamber 101. A cooking pot 7 is placed on the stove, obstructing the top of the combustion chamber 101 except for the annular flue which exists between the cooking pot 7 and the combustion chamber wall 1. The alcohol fuel 28 in the inner, cylindrical chamber 11 of the fuel vaporizer 104 is ignited and combusts by virtue of its free communication with the air.

The combustion of the fuel 28 in the inner, cylindrical chamber 11 causes the double wall 8 of the fuel vaporizer 104 to be heated. The heating of the double wall 8 causes heat to be conducted into the outer, annular chamber 10 of the fuel vaporizer 104. This heat causes the fuel in the outer, annular chamber 10 to vaporize. Because the geometry of the fuel vaporizer 104 is so adapted to maximize the flow of heat from the inner chamber 11 to the outer chamber 10 and minimize the loss of heat from the exterior surface area and thermal mass, the rate of fuel vaporization in the outer, annular chamber 10 is maximized. The vaporized fuel can only escape from the outer, annular chamber 10 via the plurality of small orifices 12 which interrupt the top closure of the outer, annular chamber 10.

In passing through the plurality of small orifices 12, the fuel vapor is accelerated such that jets of fuel vapor 26 are ejected from the fuel vaporizer 104. By virtue of their location along the top edge of the outer diameter of the fuel vaporizer 104, the jets of fuel vapor 26 are ejected directly into the upwelling convection current of combustion air 30 which has been metered and directed by the combustion chamber 101 through the primary set of air metering ports 13. This forceful convergence of the fuel vapor 26 and combustion air 30 produces effective mixing of the fuel and air and creates a hot, efficient diffusion flame—the design and dimensions of the fuel vaporizer 104 and the combustion chamber 101 being so adapted to operate together in balanced synergy and produce a stoichiometric ratio of fuel and air. The combustion gases are directed against the bottom and around the sides of the cooking pot 7 to maximize heat transfer to the cooking pot 7. In this manner the cooking performance, heat output and fuel efficiency of the stove are maximized.

Figure 5:
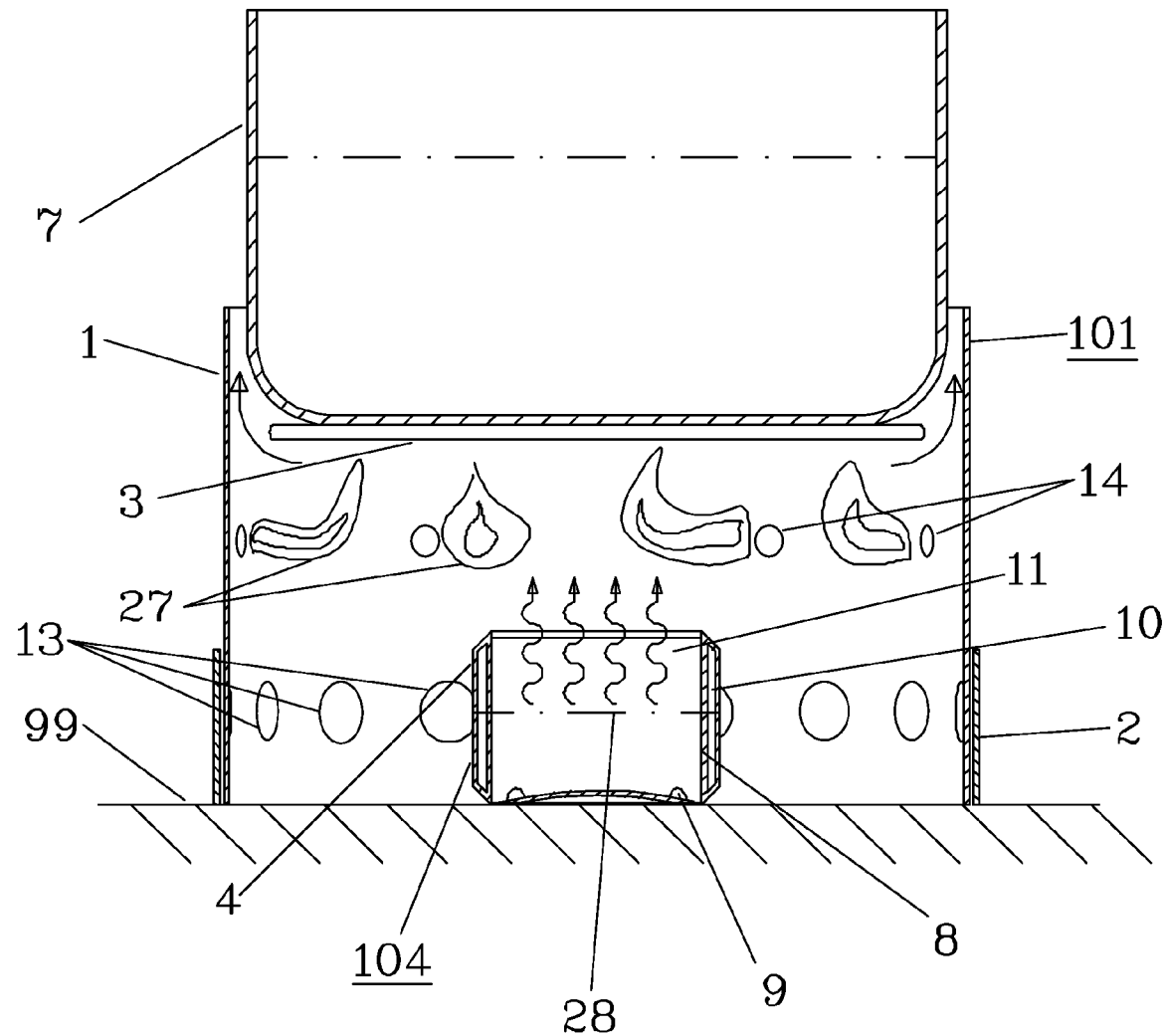
FIG. 5 shows the preferred embodiment in sectional elevation with the stove in use and configured to produce minimum heat output.

Notwithstanding the employment illustrated in FIG. 4, where both the heat output and the efficiency of the stove are maximized, the stove can be easily adjusted to reduce the heat output in order to effectively and conveniently control the cooking process. FIG. 5 shows a section through the elevation view of the stove as it is set up for cooking use and configured for minimum heat output. A cooking pot 7 is shown placed upon the stove, being supported by the pot supporting rods 3. To adjust the heat output of the stove, the obturating band 2 is slid down to cover and block the primary set of air metering ports 13. With the obturating band 2 fully occluding the primary set of air metering ports 13, the secondary set of ports 14 is fully exposed. With the obturating band 2 in this position, the primary set of air metering ports 13 is blocked, such that no air can enter the bottom half of the combustion chamber 101. This creates an anaerobic atmosphere in the bottom half of the combustion chamber 101. The absence of oxygen in this anaerobic zone prevents combustion from occurring in and about the fuel vaporizer 104. Being physically removed from, and beneath, the combustion process 27, the fuel vaporizer 104 is caused to be cooled, thereby reducing the rate of vapor generation and altering the flow pattern of fuel vapor. The quantity of fuel vapor is thereby adapted to, and conditioned by, the reduced volume and redirected flow of combustion air.

The fuel vapor diffuses into the top half of the combustion chamber 101, where it opportunistically mixes with oxygen in this rarified top zone. This forms a diverse and dynamic combustion process 27 which puts out a reduced amount of heat while spreading out within the top of the combustion chamber 101. This eliminates hot spots which impair the utility of a stove. In this manner a practical, simple and effective control is achieved over the heat output, the shape and location of the cooking flame, and the overall cooking performance of the stove. This control is also very convenient and easy to use, as the obturating band 2 is readily accessible on the outside of the combustion chamber 101. Adjusting the obturating band 2 can be accomplished without interference or removal of the cooking pot 7 simply by tapping it lightly to cause it to slide down and cover the primary set of air metering ports 13.

Consequently, the control of the stove is such that when the primary set of air metering ports 13 is exposed there is the maximum output of heat from the stove. Simply by sliding the obturating band 2 down to cover the primary set of ports 13, the secondary set of ports 14 is opened and the heat is quickly controlled and reduced. The primary set of ports 13 might alternately be partially unblocked, allowing small quantities of air into the bottom of the combustion chamber 101. This provides effective and practical control over a range of heat outputs for improved cooking performance.

Figure 6:
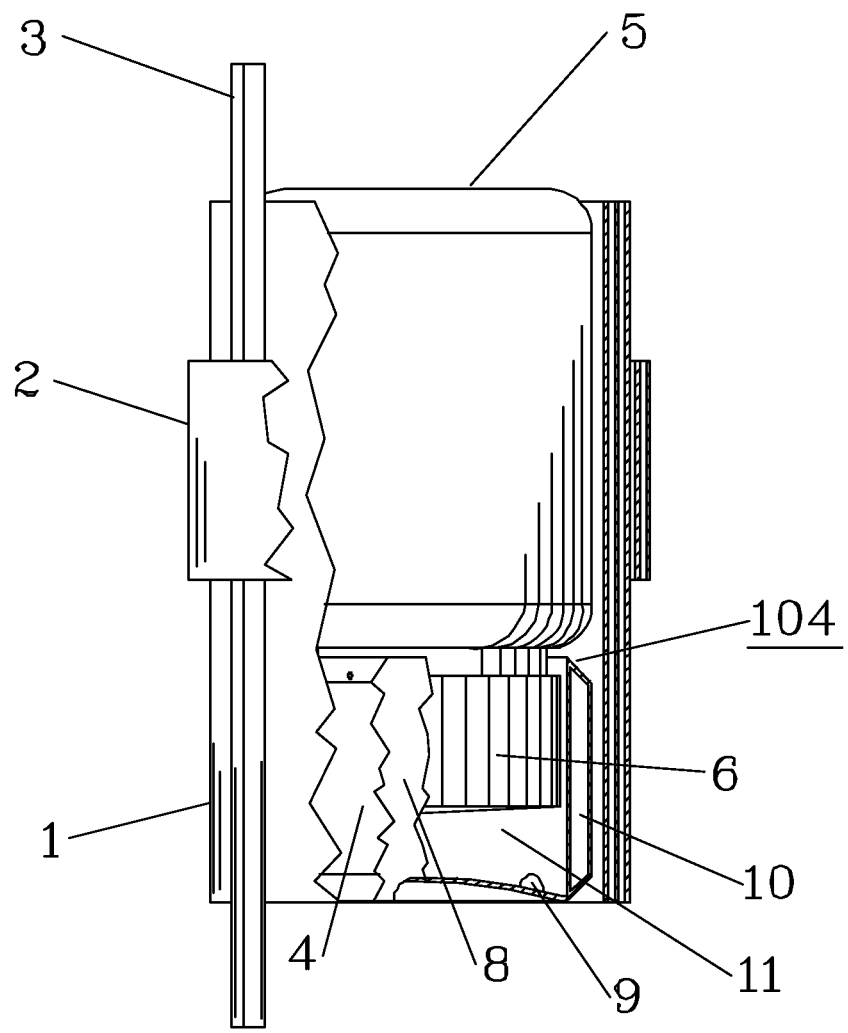
FIG. 6 shows the preferred embodiment in a cutaway, elevation view of the packed stove.
Figure 7:
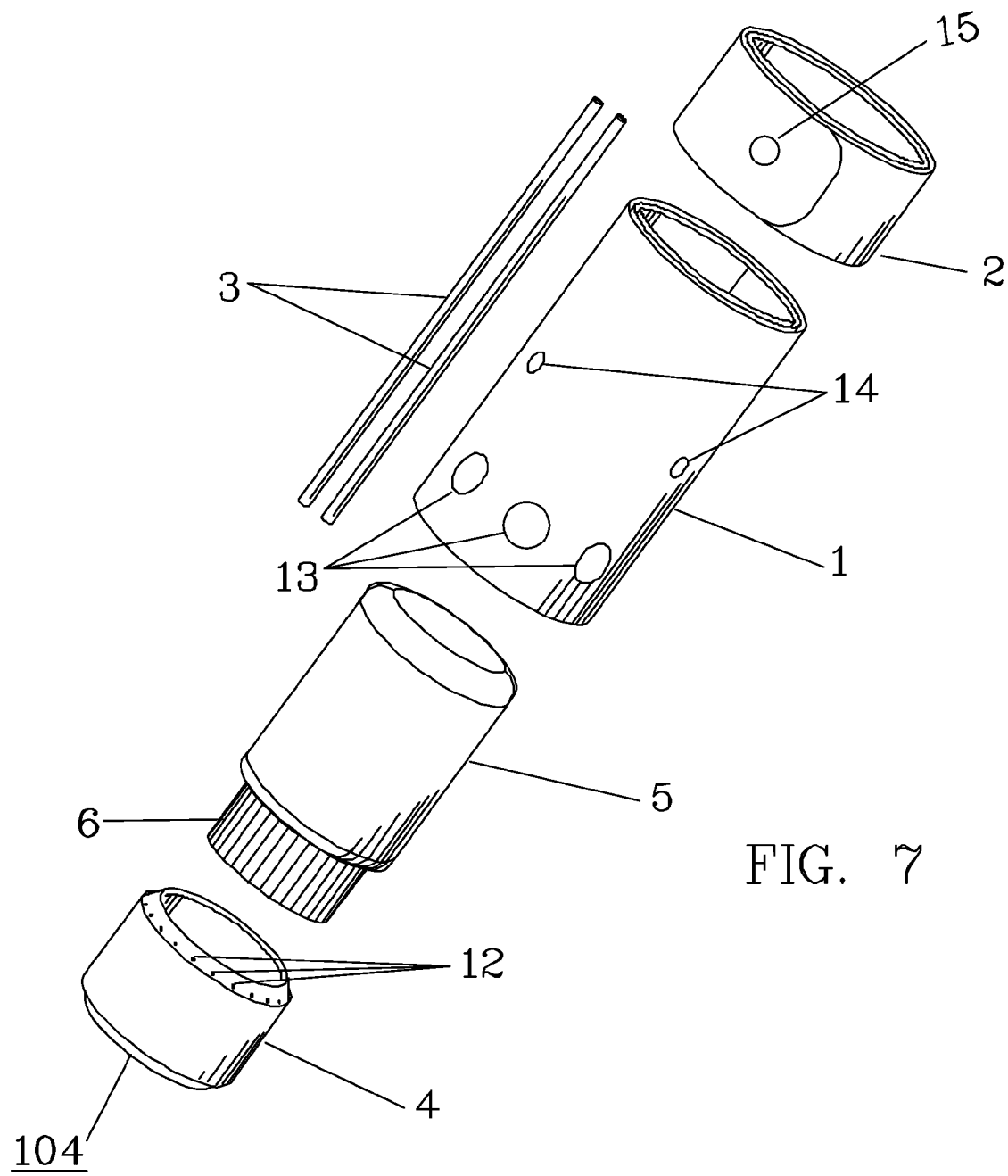
FIG. 7 shows the preferred embodiment in an exploded, perspective view of the packed stove.

FIG. 6 shows a cutaway, elevation view of the packed stove. FIG. 7 shows a perspective, exploded view of the packed stove. These figures illustrate how the stove is conceived as an integrated unit for packing and carrying. The cylindrical wall 1 of the combustion chamber 101 is formed from a thin, aluminum sheet which is attached together at its ends 17. The ends of this sheet can be unattached and the thin, aluminum sheet is sufficiently strong and flexible to be wrapped into a coil around the cylindrical fuel vaporizer 104. Likewise, the obturating band 2 of the combustion chamber 101 is formed from a thin, aluminum strip which is attached together at its ends. The ends of this strip can be unattached and the thin, aluminum band 2 is sufficiently strong and flexible to be wrapped into a coil around the coiled combustion chamber wall 1. The assemblage thereby constructed is in the form of a hollow cylinder approximately two and one-quarter inches in diameter and four inches in length.

This hollow cylinder is of sufficient diameter and sufficient length to efficiently contain a four fluid ounce fuel bottle 5, four fluid ounces being sufficient volume of fuel for several days hiking. The cap 6 of the fuel bottle 5 is of such size and geometry as to fit efficiently inside the fuel vaporizer 104. The pot supporting rods 3 store alongside this cylindrical assemblage. Thus the entire invention is rendered conveniently portable in a sturdy, lightweight and compact package which is completely self contained, comprising the entire stove and the fuel bottle. This package fits in the palm of the hand and weighs only a few ounces.

Figure 8:
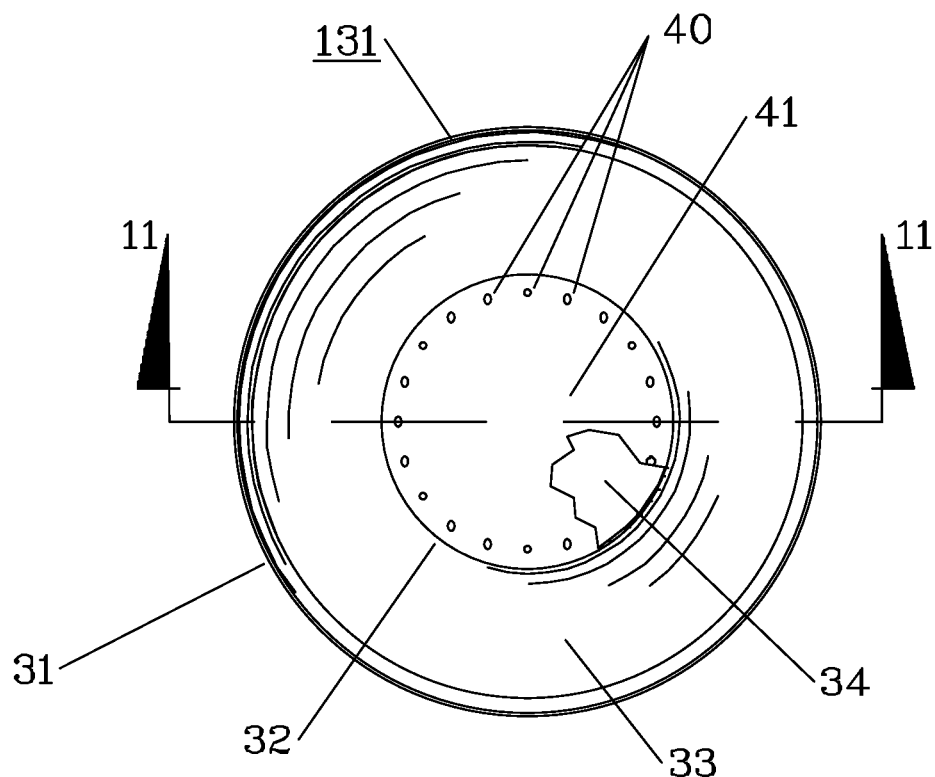
FIG. 8 shows an alternate embodiment of the fuel vaporizer in a plan view.
Figure 9:
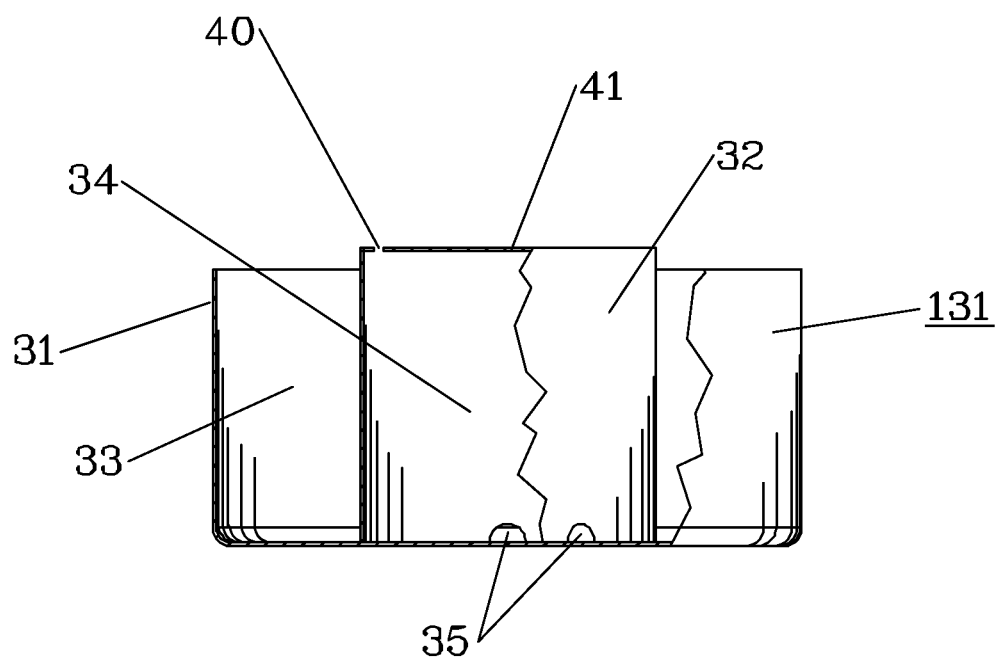
FIG. 9 shows this alternate embodiment of the fuel vaporizer in a cutaway, sectional elevation view.
Figure 10:
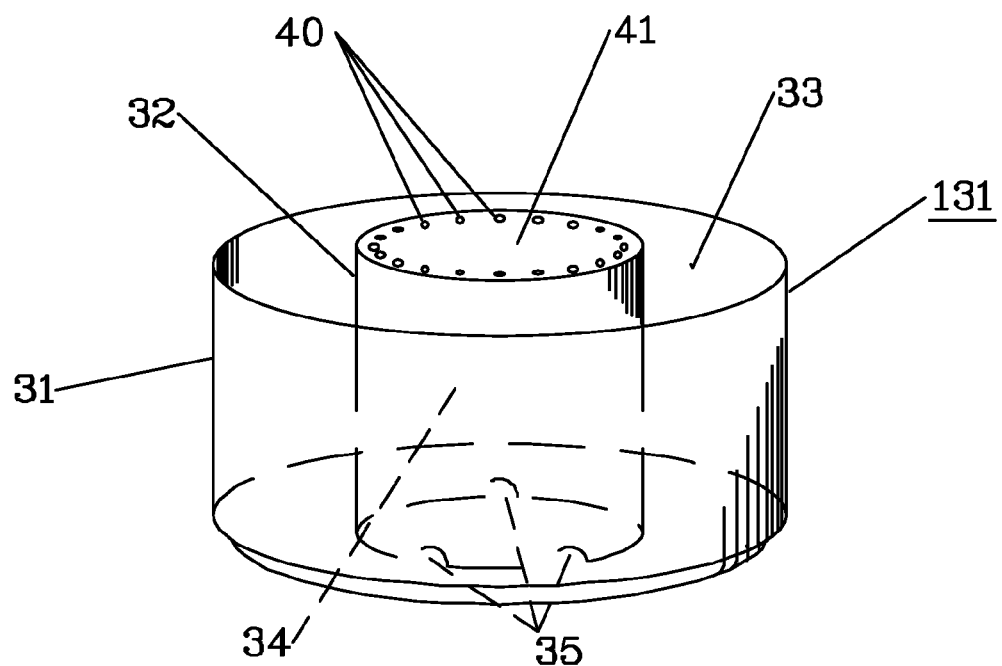
FIG. 10 shows this alternate embodiment of the fuel vaporizer in a perspective view.

FIG. 8 shows a plan view of an alternate embodiment of the fuel vaporizer 131. FIG. 9 shows a cutaway elevation view of this alternate embodiment fuel vaporizer 131, and FIG. 10 shows a perspective view. The alternate embodiment of the fuel vaporizer 131 is adapted to concentrate a large amount of heat on a small, confined chamber 34. The alternate embodiment fuel vaporizer 131 also surrounds and envelopes this small, confined chamber 34 in such a way that very little heat can escape from it. In this way the alternate embodiment of the fuel vaporizer 131 is capable of achieving a high rate of fuel vaporization with the concatenate effect of a high overall heat output for the stove. The alternate embodiment fuel vaporizer 131 is potentially capable of even greater heat output than the preferred embodiment 104 of the fuel vaporizer.

The alternate embodiment of the fuel vaporizer 131 comprises a vessel in the shape of a shallow, cylindrical cup 31. This shallow, cylindrical cup 31 incorporates a double wall 32. By means of this double wall 32 the interior volume of the shallow, cylindrical cup 31 is divided into two chambers 33 and 34. The first chamber 34 is an inner chamber. The inner chamber 34 forms a cylinder whose diameter is defined by the inside diameter of the double wall 32. This cylindrical, inner chamber 34 is coaxial and concentric with the shallow, cylindrical cup 31. The second chamber 33 is an outer chamber. The outer chamber 33 is annular in form, this annulus being formed by the gap between the cylindrical cup 31 and the double wall 32. The outer, annular chamber 33 fully encircles the inner, cylindrical chamber 34. Said chambers 33 and 34 are separated by the double wall 32. The inner and outer chambers 33 and 34 have some connection and may enjoy limited intercourse by means of a plurality of small ports 35 at the base of the double wall 32.

The outer, annular chamber 33 is open, being uncovered at the top, thereby forming an open chamber. The contents of this open, outer, annular chamber 33 may freely communicate with the air. The inner, cylindrical chamber 34 is closed, being covered at the top, thereby forming a closed chamber. This closure 41 is interrupted only by a plurality of small apertures 40. This plurality of small apertures 40 is arrayed radially and angularly about the top closure 41 of the inner, cylindrical chamber 34.

Figure 11:
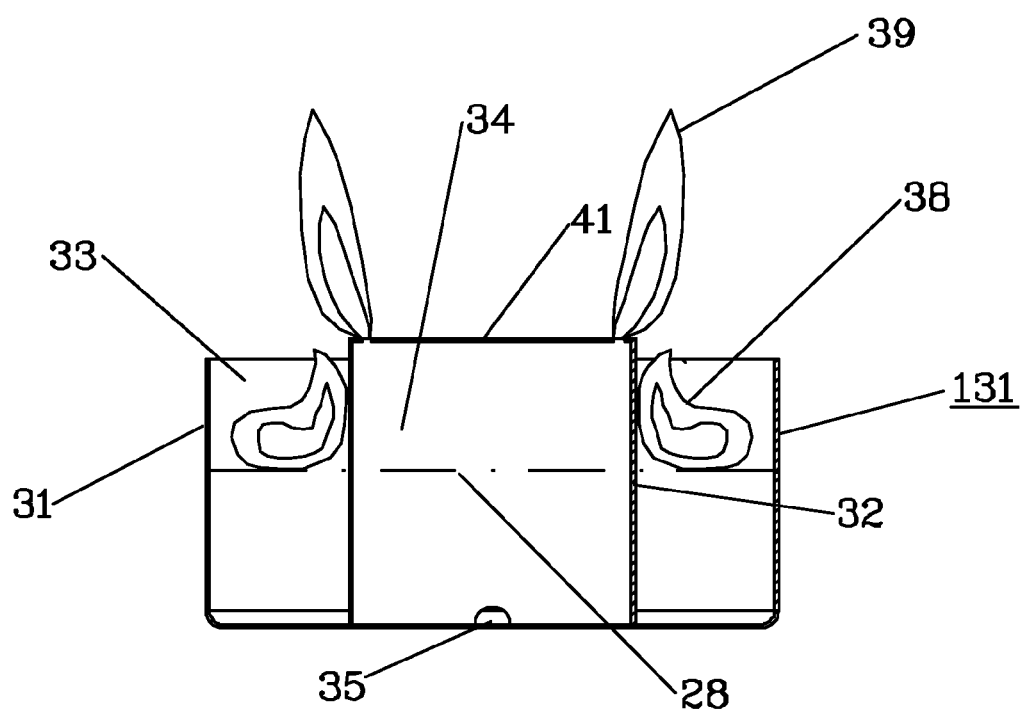
FIG. 11 shows this alternate embodiment of the fuel vaporizer in sectional elevation when it is in use.

FIG. 11 shows a section view of the fuel vaporizer 131 in use. When the stove is in use, alcohol fuel 28 is poured into the outer, annular chamber 33 of the fuel vaporizer 131. By means of the plurality of small ports 35 at the base of the double wall 32, the fuel flows into the inner, cylindrical chamber 34 and seeks a common level within the inner chamber 34 and the outer chamber 33. The alcohol fuel 28 in the outer, annular chamber 33 of the fuel vaporizer 131 is ignited and causes combustion 38 by virtue of its free communication with the air.

The combustion 38 of the fuel 28 in the outer, annular chamber 33 causes the double wall 32 of the fuel vaporizer 131 to be heated. Because of this heating action accomplished in the outer, annular chamber 33, this outer, annular chamber 33 can be referred to as the heating chamber. The heating of the double wall 32 causes heat to be conducted into the inner, cylindrical chamber 34 of the fuel vaporizer 131. This heat causes the fuel 28 in the inner, cylindrical chamber 34 to vaporize. Because of this vaporizing action accomplished in the inner, cylindrical chamber 34, this inner, cylindrical chamber 34 can be referred to as the vaporizing chamber. The vaporized fuel can only escape from the inner, cylindrical, vaporizing chamber 34 via the plurality of small apertures 40 which interrupt the top closure 41 of the inner, cylindrical, vaporizing chamber 34. As the fuel vapor escapes through this plurality of small apertures 40, it is accelerated into jets 39 thereby entraining and actively mixing with the combustion air.

The alternate embodiment 131 shares various features with the preferred embodiment fuel vaporizer 104 of the fuel vaporizer, as well as employing important differences. Both embodiments of the fuel vaporizer comprise two, concentric, interconnected chambers separated by a double wall. Both embodiments of the fuel vaporizer employ one open chamber to generate heat by means of open combustion. Both embodiments of the fuel vaporizer employ one closed chamber to generate vaporized fuel and accelerate this vapor into jets.

The essential difference between the preferred and alternate embodiments of the fuel vaporizer is the reversal in the function of the inner and outer chambers. The preferred embodiment fuel vaporizer 104 is adapted to nest efficiently with the other components so that the stove can be stowed in a single, compact unit. This requirement dictates certain aspects of the preferred embodiment fuel vaporizer's 104 form, geometry and dimensions. These dictated aspects of the preferred embodiment fuel vaporizer's 104 form, geometry and dimensions necessitate certain compromises that preclude the total optimization of the fuel vaporizer's performance. The primary compromise involves the heat which is lost from the outer, annular vaporizing chamber 10 through the outside wall of the fuel vaporizer 104.

The alternate embodiment fuel vaporizer 131 is engineered specifically to maximize the rate of fuel vaporization and the heat output of the stove. The form and geometry of the alternate embodiment are not constrained by packaging requirements or other such limitations. This frees the alternate embodiment fuel vaporizer 131 to be fully optimized for heat output and fuel efficiency. By engulfing the inner, cylindrical vaporizing chamber 34 in combustion 38, its form and design are adapted to minimize heat loss and produce the highest possible temperatures to vaporize and superheat the fuel 28. By providing the outer, annular heating chamber 33 with an outer perimeter, more oxygen is available for the combustion process 38 therein. These adaptations enable the alternate embodiment fuel vaporizer 131 to achieve the highest efficiency and heat output.

Figure 12:
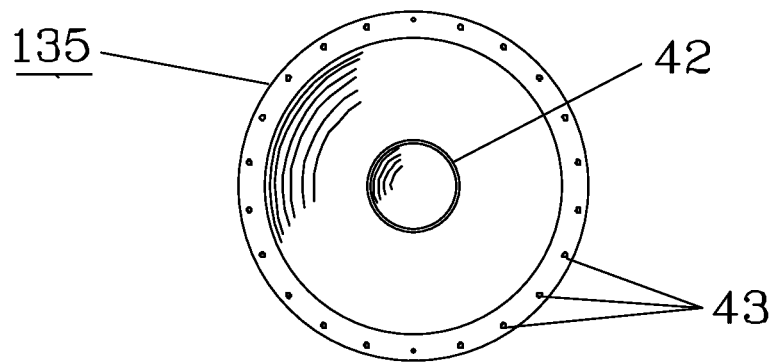
FIG. 12 shows an additional alternate embodiment of the fuel vaporizer in a plan view.
Figure 13:
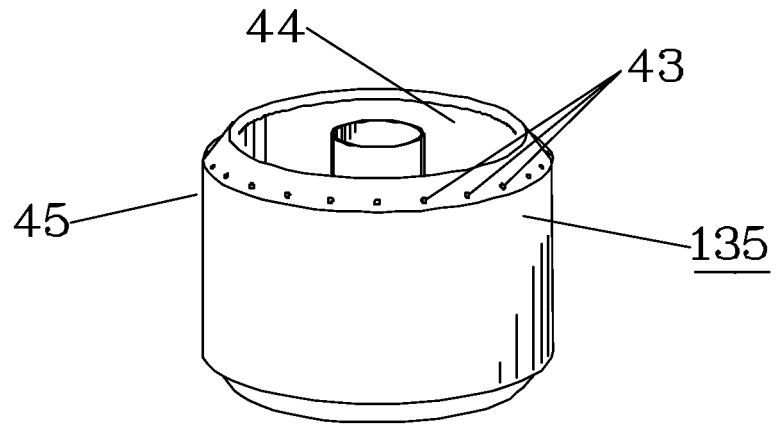
FIG. 13 shows this additional alternate embodiment of the fuel vaporizer in a perspective view.
Figure 14:
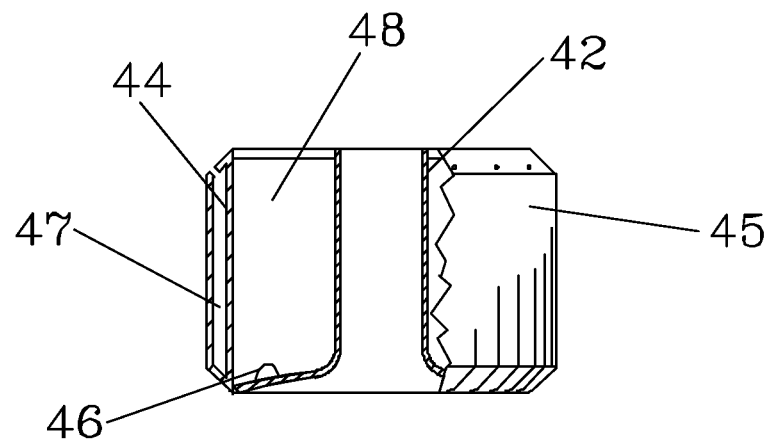
FIG. 14 shows this additional embodiment of the fuel vaporizer in a cutaway, elevation view.

FIG. 12 shows a plan view of an alternate embodiment of the fuel vaporizer 135. FIG. 13 shows a perspective view of this alternate embodiment 135, and FIG. 14 shows a cutaway, sectional elevation view. The alternate embodiment of the fuel vaporizer 135 is provided with cylindrical duct 42 coaxial with the body of the fuel vaporizer. This cylindrical duct 42 extends thru the bottom of the fuel vaporizer and has a height about equal to that of the fuel vaporizer 135. This cylindrical duct 42 is adapted to provide a source of combustion air to the inner, annular chamber 48 of the fuel vaporizer 135. By providing combustion air to the inner, annular chamber 48, a greater amount of heat can be generated in the inner, annular chamber 48. In this way the alternate embodiment of the fuel vaporizer 135 is capable of achieving a high rate of fuel vaporization with the concatenate effect of a high overall heat output for the stove. The alternate embodiment 135 is potentially capable of even greater heat output than the preferred embodiment 104 of the fuel vaporizer.

The alternate embodiment 135 shares various features with the preferred embodiment 104 of the fuel vaporizer, and operates in a similar manner. The alternate embodiment of the fuel vaporizer 135 comprises a vessel in the shape of a shallow, cylindrical cup 45. This shallow, cylindrical cup 45 incorporates a double wall 44. By means of this double wall 44 the interior volume of the shallow, cylindrical cup 45 is divided into two chambers 47 and 48. The first chamber 48 is an inner chamber. The inner chamber 48 comprises an annular volume whose inside diameter is defined by the outside diameter of the cylindrical duct 42, and whose outside diameter is defined by the inside diameter of the double wall 44. This annular, inner chamber 48 is coaxial and concentric with the shallow, cylindrical cup 45. The second chamber 47 is an outer chamber. The outer chamber 47 is annular in form, this annulus being formed by the gap between the cylindrical cup 45 and the double wall 44. The outer, annular chamber 47 fully encircles the inner, annular chamber 48. Said chambers 47, 48 are separated by the double wall 44. The inner and outer chambers 47, 48 have some connection and may enjoy limited intercourse by means of a plurality of small ports 46 at the base of the double wall 44.

The outer, annular chamber 47 is closed, being covered at the top, thereby forming a closed chamber. This closure is interrupted only by a plurality of small apertures 43. The inner, annular chamber 48 is open, being uncovered at the top, thereby forming an open chamber. The contents of this open, inner, annular chamber 48 may freely communicate with the air. The contents of this open, inner, annular chamber 48 are directly provided with a supply of combustion air thru the cylindrical duct 42.

Figure 15:
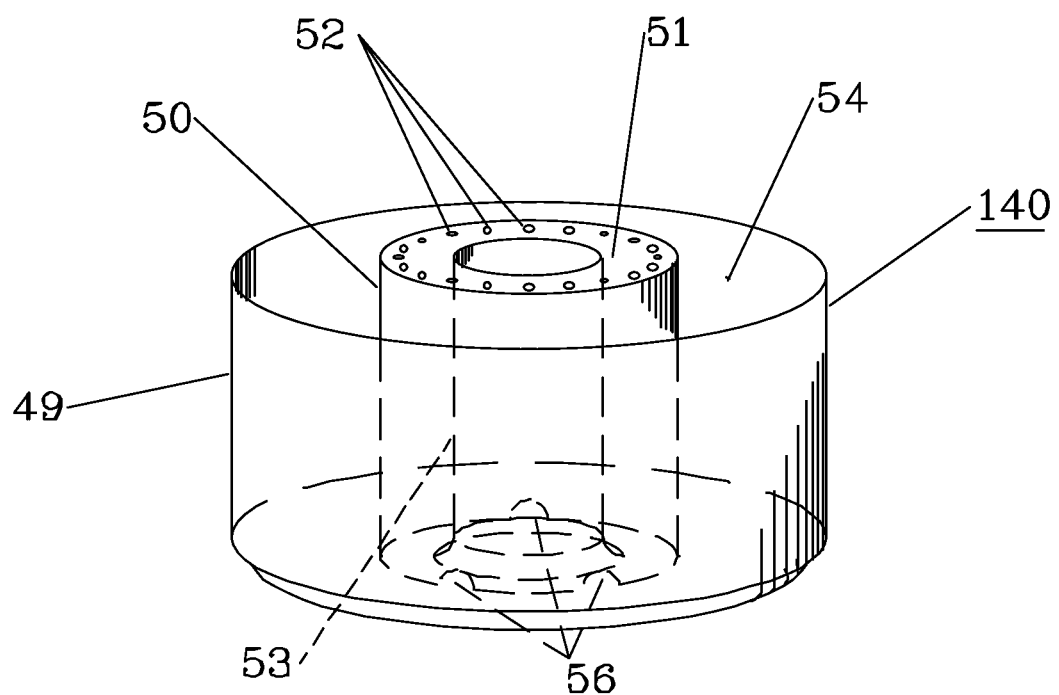
FIG. 15 shows an additional alternate embodiment of the fuel vaporizer in a perspective view.
Figure 16:
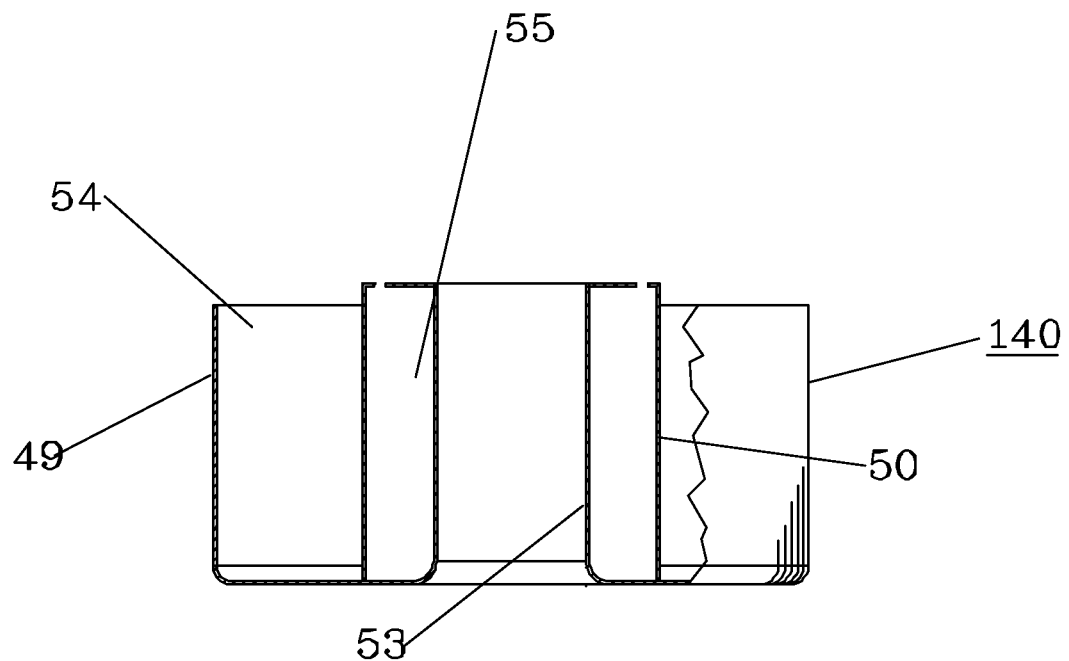
FIG. 16 shows this additional alternate embodiment of the fuel vaporizer in a cutaway, sectional elevation view.

FIG. 15 shows a perspective view of an alternate embodiment of the fuel vaporizer 140. FIG. 16 shows a cutaway, sectional elevation view of this alternate embodiment 140. The alternate embodiment of the fuel vaporizer 140 is provided with cylindrical duct 53 coaxial with the body of the fuel vaporizer. This cylindrical duct 53 extends thru the center of the fuel vaporizer 140. This cylindrical duct 53 is adapted to provide a source of combustion air to the center of the fuel vaporizer 140. By providing combustion air to the center of the fuel vaporizer 140, complete combustion of the vaporized fuel can be effected.

The alternate embodiment 140 shares various features with the alternate embodiment 131 of the fuel vaporizer, and operates in a similar manner. The alternate embodiment of the fuel vaporizer 140 comprises a vessel in the shape of a shallow, cylindrical cup 49. This shallow, cylindrical cup 49 incorporates a double wall 50. By means of this double wall 50 the interior volume of the shallow, cylindrical cup 49 is divided into two chambers 54, 55. Chamber 55 is an inner chamber. The inner chamber 55 comprises an annular volume whose inside diameter is defined by the outside diameter of the cylindrical duct 53, and whose outside diameter is defined by the inside diameter of the double wall 50. This annular, inner chamber 55 is coaxial and concentric with the shallow, cylindrical cup 49. The second chamber 54 is an outer chamber. The outer chamber 54 is annular in form, this annulus being formed by the gap between the cylindrical cup 49 and the double wall 50. The outer, annular chamber 54 fully encircles the inner, annular chamber 55. Said chambers 54, 55 are separated by the double wall 50. The outer and inner chambers 54, 55 have some connection and may enjoy limited intercourse by means of a plurality of small ports 56 at the base of the double wall 50.

The inner, annular chamber 55 is closed, being covered at the top by a cover 51, thereby forming a closed chamber. This cover 51 is interrupted only by a plurality of small apertures 52. The outer, annular chamber 54 is open, being uncovered at the top, thereby forming an open chamber.

Additional Alternate Embodiment of the Fuel Vaporizer

Figure 17:
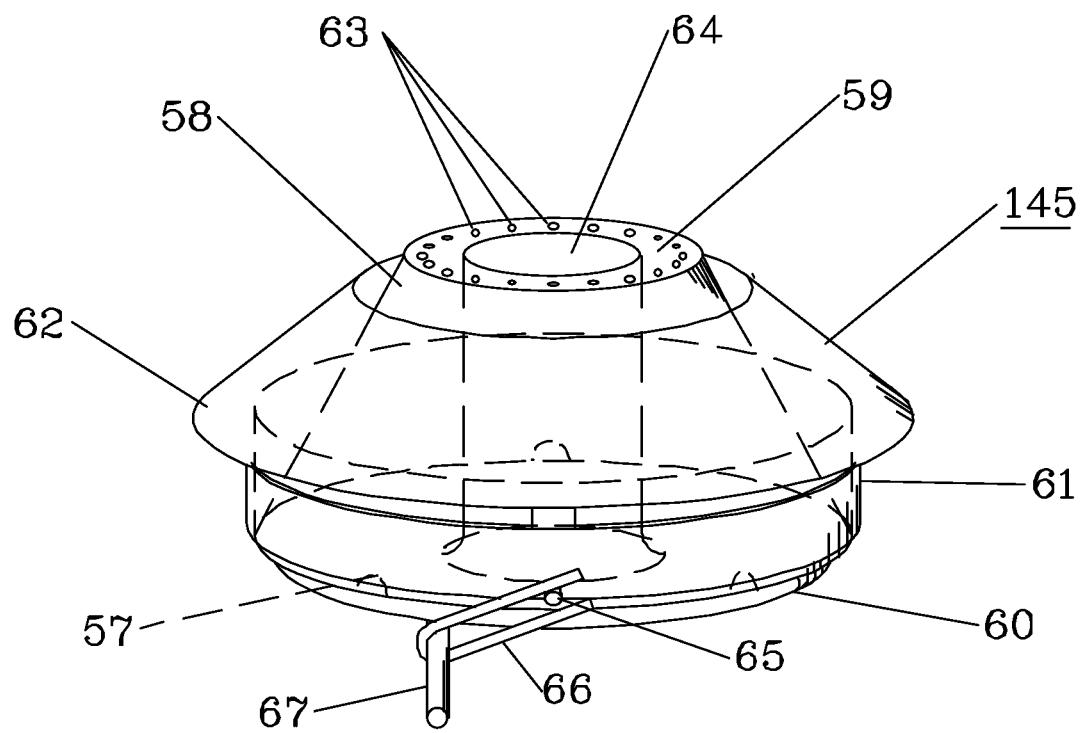
FIG. 17 shows an additional alternate embodiment of the fuel vaporizer and obturating device in a perspective view.
Figure 18:
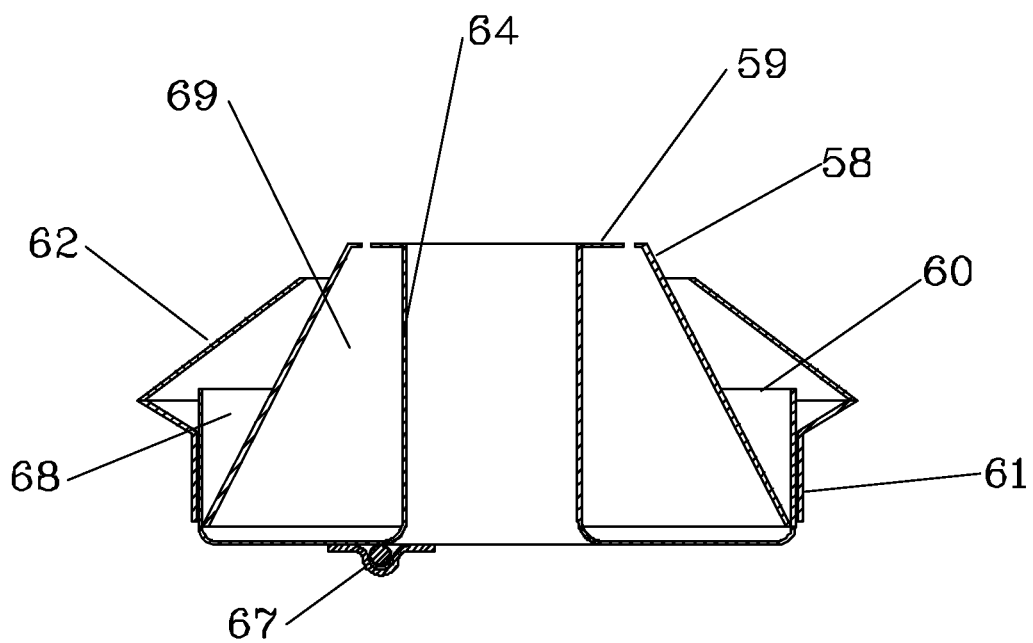
FIG. 18 shows this additional alternate embodiment of the fuel vaporizer and obturating device in a sectional, elevation view.
Figure 19:
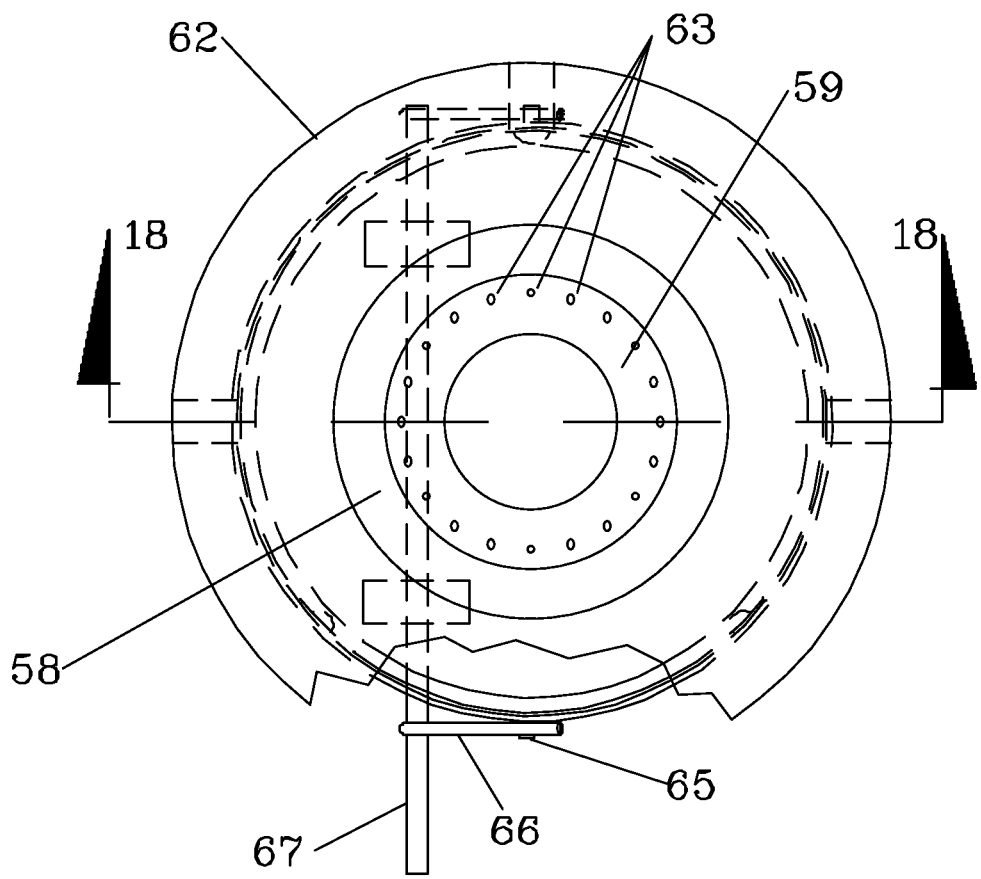
FIG. 19 shows this additional alternate embodiment of the fuel vaporizer and obturating device in a plan view.
Figure 20:
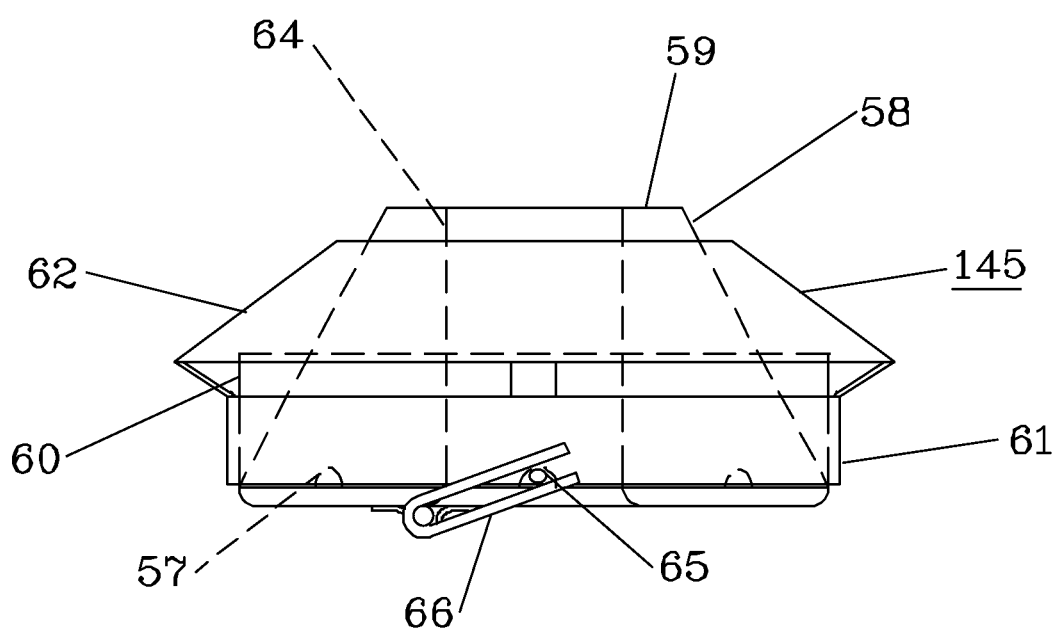
FIG. 20 shows this additional alternate embodiment of the fuel vaporizer and obturating device in an elevation view.

FIG. 17 shows a perspective view of an alternate embodiment of the fuel vaporizer 145. FIG. 18 shows a sectional elevation view of this alternate embodiment 145. FIG. 19 shows a plan view and 20 shows an elevation view of this alternate embodiment 145. The alternate embodiment of the fuel vaporizer 145 is provided with cylindrical duct 64 coaxial with the body of the fuel vaporizer. This cylindrical duct 64 extends thru the center of the fuel vaporizer 145. This cylindrical duct 64 is adapted to provide a source of combustion air to the center of the fuel vaporizer 145. By providing combustion air to the center of the fuel vaporizer 145, complete combustion of the vaporized fuel can be effected.

The alternate embodiment 145 shares various features with the alternate embodiment 140 of the fuel vaporizer, and operates in a similar manner. The alternate embodiment of the fuel vaporizer 145 comprises a vessel in the shape of a shallow, cylindrical cup 60. This shallow, cylindrical cup 60 incorporates a conical wall 58. By means of this conical wall 58 the interior volume of the shallow, cylindrical cup 60 is divided into two chambers 68, 69. Chamber 69 is an inner chamber. The inner chamber 69 comprises a substantially annular volume whose inside diameter is defined by the outside diameter of the cylindrical duct 64, and whose outside surface is defined by the inside surface of the conical wall 58. This substantially annular, inner chamber 69 is coaxial and concentric with the shallow, cylindrical cup 60. The second chamber 68 is an outer chamber. The outer chamber 68 is substantially annular in form, being formed by the gap between the cylindrical cup 60 and the conical wall 58. The outer, substantially annular chamber 68 fully encircles the inner, substantially annular chamber 69. Said chambers 68, 69 are separated by the cylindrical wall 58. The outer and inner chambers 68, 69 have some connection and may enjoy limited intercourse by means of a plurality of small ports 57 at the base of the cylindrical wall 58.

The inner, substantially annular chamber 69 is closed, being covered at the top by a cover 59, thereby forming a closed chamber. This closure is interrupted only by a plurality of small apertures 63. The outer, substantially annular chamber 68 is partially covered by an obturating device 62. This obturating device 62 is slidably mounted on the outside of the shallow cup 60 by means of the cylindrical collar 61. The cylindrical collar 61 is actuated by means of a Scotch Yoke mechanism 65, 66, 67. Rotating the rod 67 about its axis causes the levers 66 to engage the pins 65, alternately causing the pins to be raised or lowered. The pins 65 are affixed to the cylindrical collar 61. By means of this slidable mounting, the obturating device 62 can be raised or lowered over the chamber 68. With the obturating device 62 in the raised position, the chamber 68 is substantially open to the air, allowing combustion to occur in the chamber 68. With the obturating device in the lowered position, the chamber 68 is closed, extinguishing combustion in the chamber 68. By so regulating the combustion in the chamber 68, the overall heat output of the fuel vaporizer can be controlled.

Figure 29:
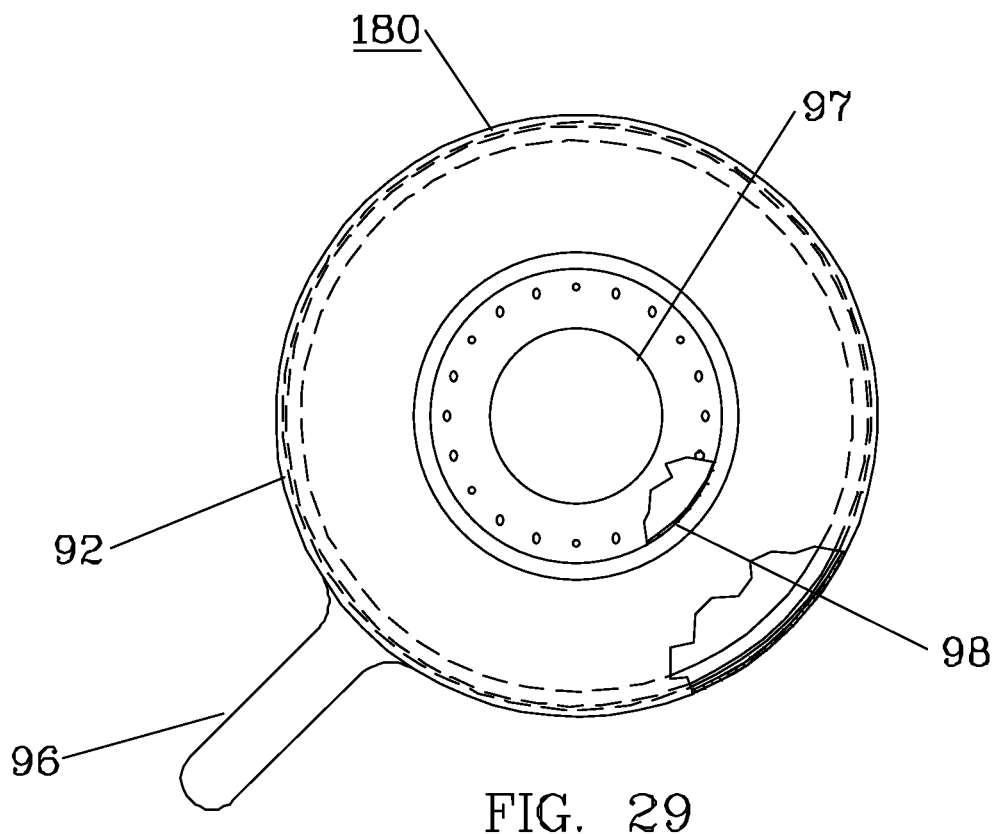
FIG. 29 shows an additional alternate embodiment of the fuel vaporizer and obturating device in a plan view.
Figure 30:
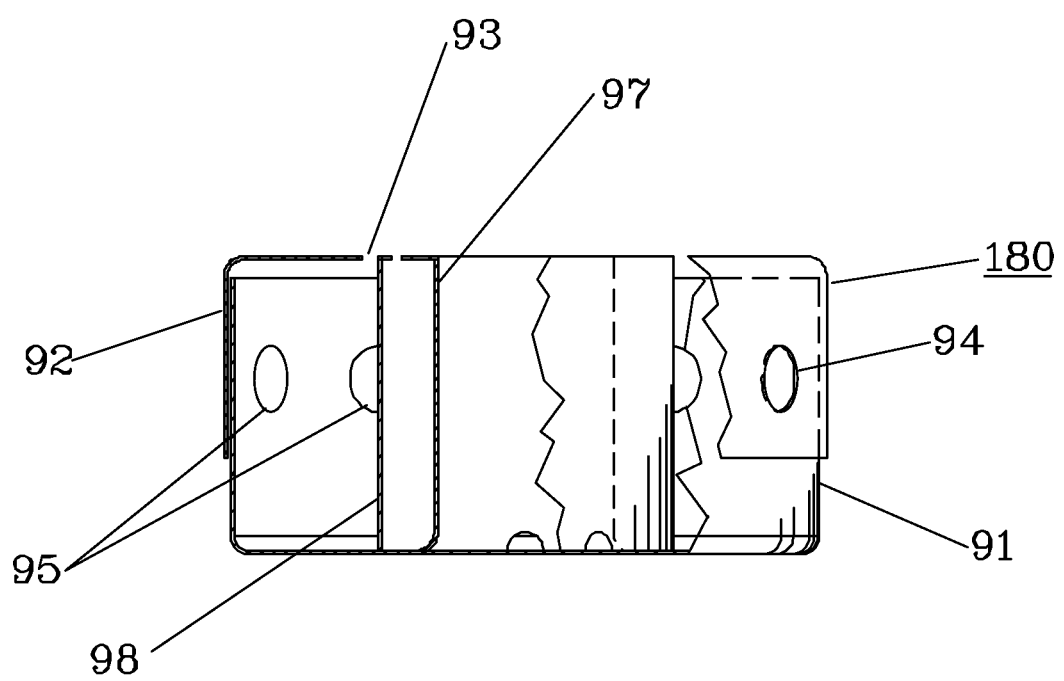
FIG. 30 shows this additional alternate embodiment of the fuel vaporizer and obturating device in a cutaway, sectional elevation view.

FIG. 29 shows a plan view of an alternate embodiment of the fuel vaporizer 180. FIG. 30 shows a cutaway, sectional elevation view of this alternate embodiment 180. The alternate embodiment 180 shares various features with the alternate embodiments 140 and 145 of the fuel vaporizer, and operates in a similar manner. The alternate embodiment of the fuel vaporizer 180 is provided with cylindrical duct 97 coaxial with the body of the fuel vaporizer. This cylindrical duct 97 extends thru the center of the fuel vaporizer 180. This cylindrical duct 97 is adapted to provide a source of combustion air to the center of the fuel vaporizer 180. By providing combustion air to the center of the fuel vaporizer 180, complete combustion of the vaporized fuel can be effected.

The alternate embodiment of the fuel vaporizer 180 comprises a vessel in the shape of a shallow, cylindrical cup 91. This shallow, cylindrical cup 91 comprises a double wall 98. By means of this double wall 98 the interior volume of the shallow, cylindrical cup 91 is divided into two chambers. The cup 91 incorporates a plurality of ports 95, which perforate the outer wall of the cup 91. The fuel vaporizer 180 comprises an obturating device 92 in the shape of an inverted, shallow, cylindrical cup, which is rotatably mounted around the outside cylindrical wall of the shallow, cylindrical cup 91. The obturating device is so dimensioned to create an annular gap 93 between the edge of the obturating device 92 and the double wall 98. The obturating device 92 incorporates a plurality of ports 94 which perforate the outer cylindrical wall of the obturating device 92. These ports 94 of the obturating device 92 are executed such that they can be aligned with the ports 95 of the shallow cylindrical cup 91, thereby opening the ports 95. Alternately, these ports 94 can be misaligned with the ports 95, by means of a rotational displacement of the obturating device 92. Ports 94 and ports 95 being so misaligned, thereby cause ports 95 to be closed. The rotational displacement of the obturating device is facilitated by the tab 96. By so aligning the ports 94 and ports 95 combustion in the outer chamber can be regulated, whereby the overall heat output of the fuel vaporizer can be controlled.

Figure 21:
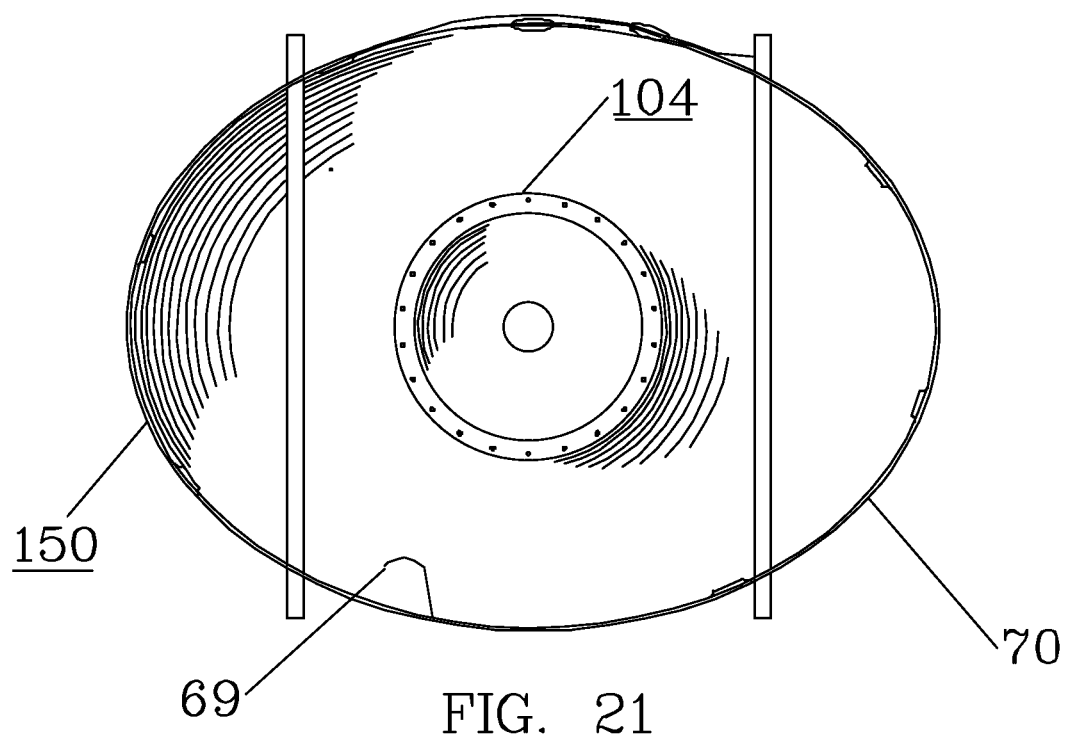
FIG. 21 shows an alternate embodiment of the combustion chamber and obturating device in a plan view.

FIG. 21 shows a plan view of an alternate embodiment of the combustion chamber 150. This alternate embodiment comprises a combustion chamber 69 and an obturating device 70 which possess an elliptical planform.

Figure 22:
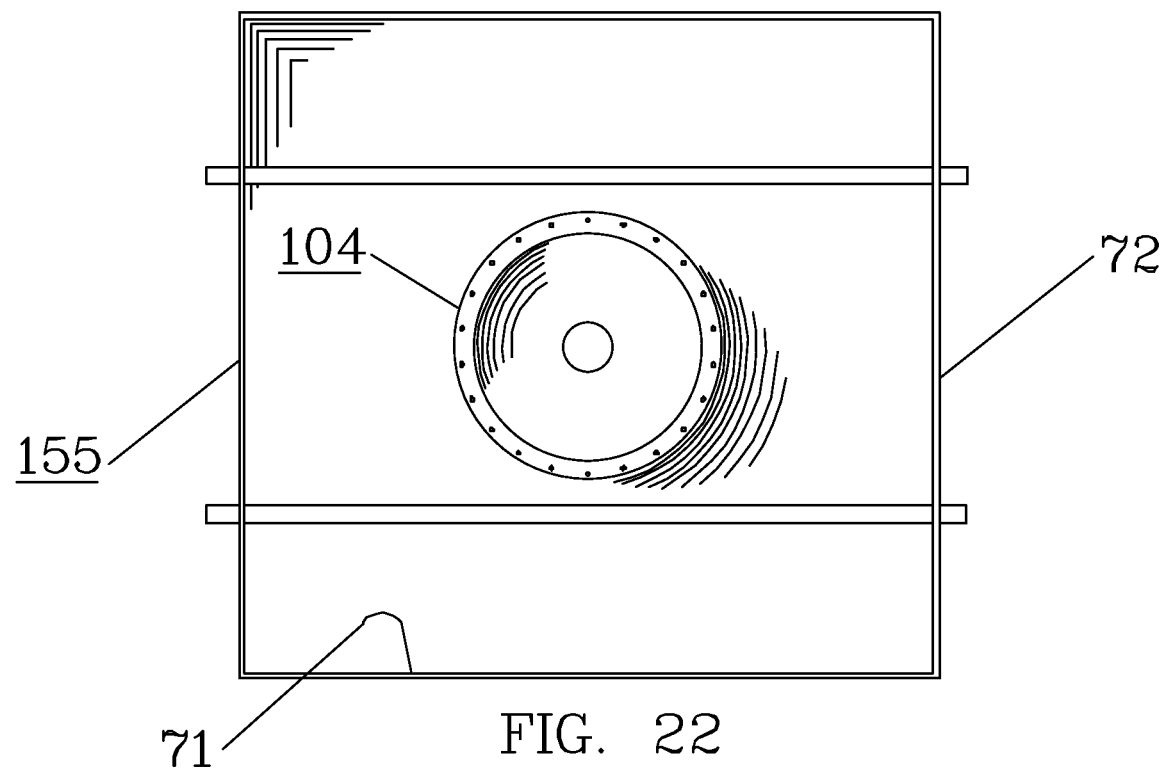
FIG. 22 shows an additional alternate embodiment of the combustion chamber and obturating device in a plan view.

FIG. 22 shows a plan view of an alternate embodiment of the combustion chamber 155. This alternate embodiment comprises a combustion chamber 71 and an obturating device 72 which possess a rectangular planform.

Figure 23:
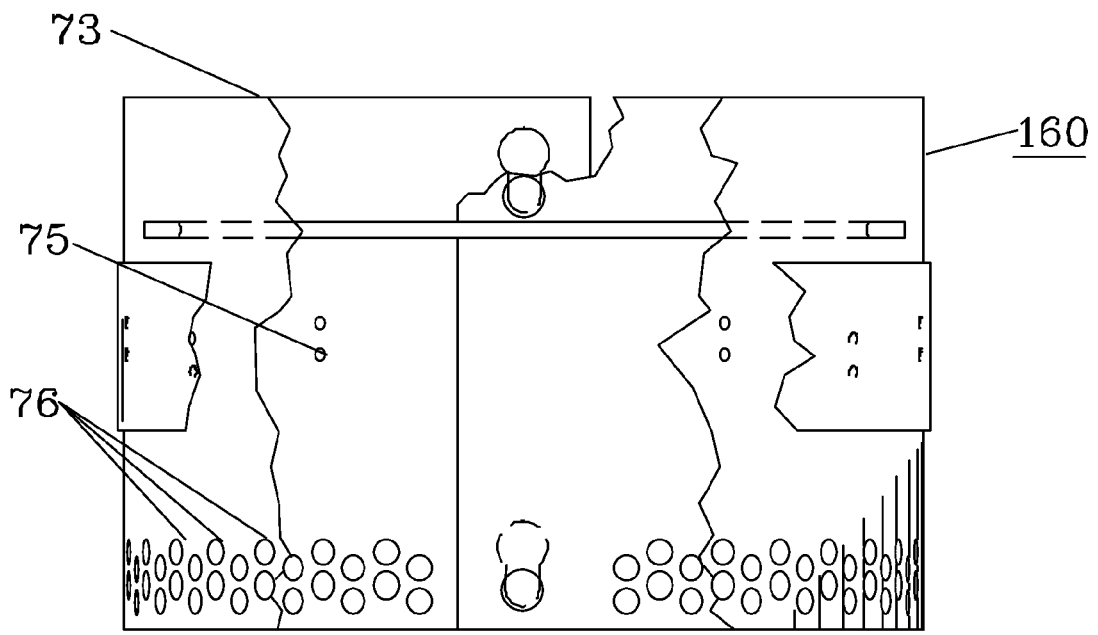
FIG. 23 shows an additional alternate embodiment of the combustion chamber and obturating device in a cutaway, elevation view.

FIG. 23 shows an elevation view of an alternate embodiment of the combustion chamber 160. This alternate embodiment comprises a combustion chamber 73 having a primary set of air metering ports 76 which is effected as a pattern of numerous small ports. The secondary set of air metering ports 75, is also effected as a pattern of small ports.

Figure 24:
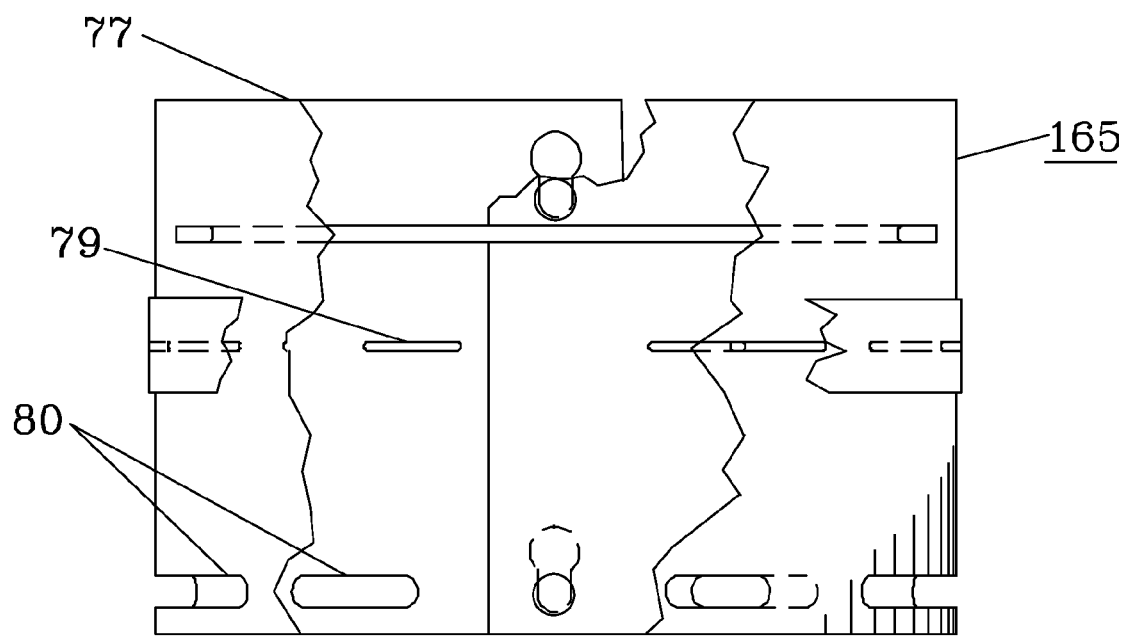
FIG. 24 shows an additional alternate embodiment of the combustion chamber and obturating device in a cutaway, elevation view.

FIG. 24 shows an elevation view of an alternate embodiment of the combustion chamber 165. This alternate embodiment comprises a combustion chamber 77 having a primary set of air metering ports 80 which is effected as a series of elongated slots. The secondary set of air metering ports 79 is also effected as a pattern of elongated slots.

Figure 25:
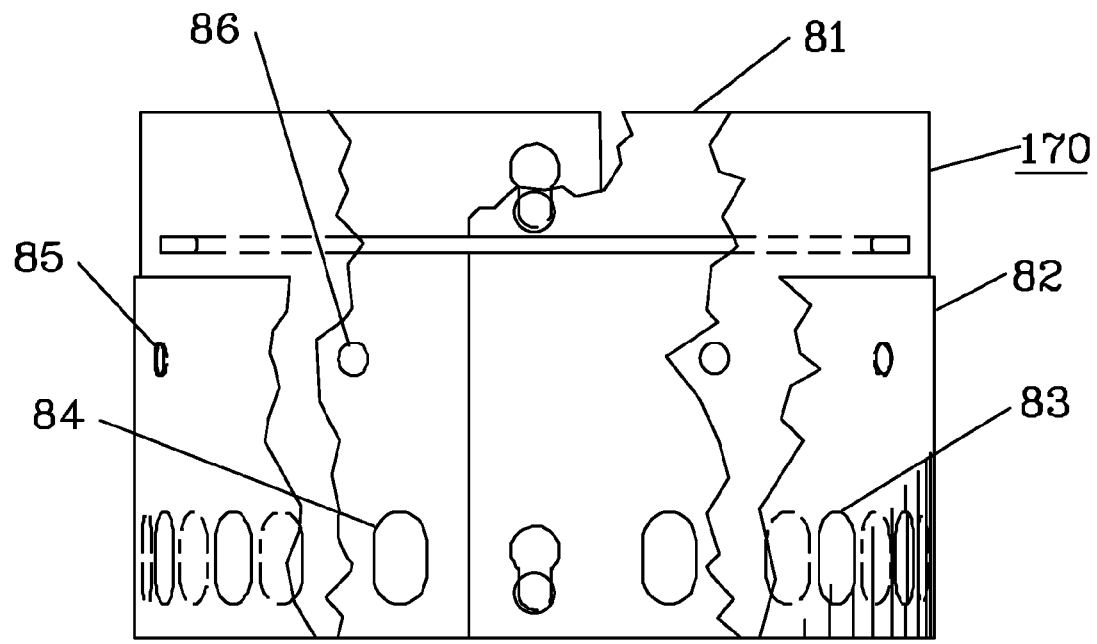
FIG. 25 shows an additional alternate embodiment of the combustion chamber and obturating device in a cutaway, elevation view, with the obturating device positioned to produce minimum heat output.
Figure 26:
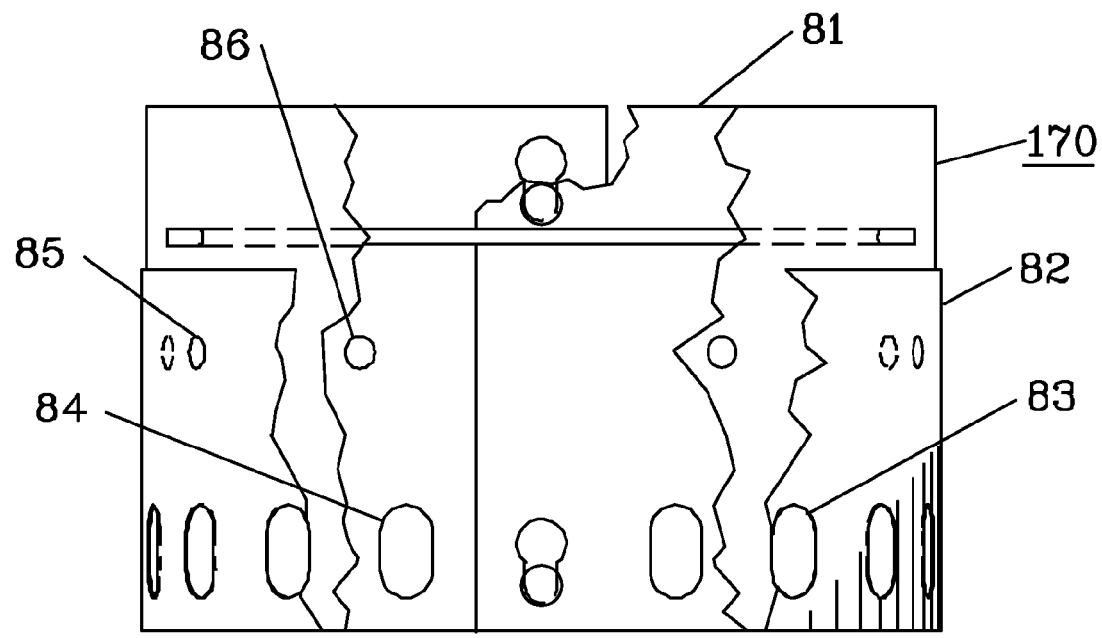
FIG. 26 shows this additional alternate embodiment of the combustion chamber and obturating device in a cutaway, elevation view, with the obturating device positioned to produce maximum heat output.

FIGS. 25 and 26 show elevation views of an alternate embodiment of the combustion chamber and obturating device 170. This alternate embodiment comprises an obturating device 82 which is rotatably mounted on the outside of the combustion chamber 81. The obturating device 82 incorporates a primary set of air metering ports 83 and a secondary set of air metering ports 85. The combustion chamber 81 incorporates a primary set of air metering ports 84 and a secondary set of air metering ports 86. The primary ports 83 of the obturating device 82 coincide with the primary ports 84 of the combustion chamber 81. The secondary ports 85 of the obturating device 82 coincide with the secondary ports 86 of the combustion chamber 81. The primary ports 83 of the obturating device 82 are angularly offset from the secondary ports 85, with respect to the corresponding ports 84, 86 of the combustion chamber 81.

FIG. 25 shows the obturating device 82 rotatably positioned to close off the primary ports 84 of the combustion chamber 81. In this position the secondary ports 86 of the combustion chamber 81 are opened.

FIG. 26 shows the obturating device 82 rotatably positioned to close off the secondary ports 86 of the combustion chamber 81. In this position the primary ports 84 of the combustion chamber 81 are opened.

Figure 27:
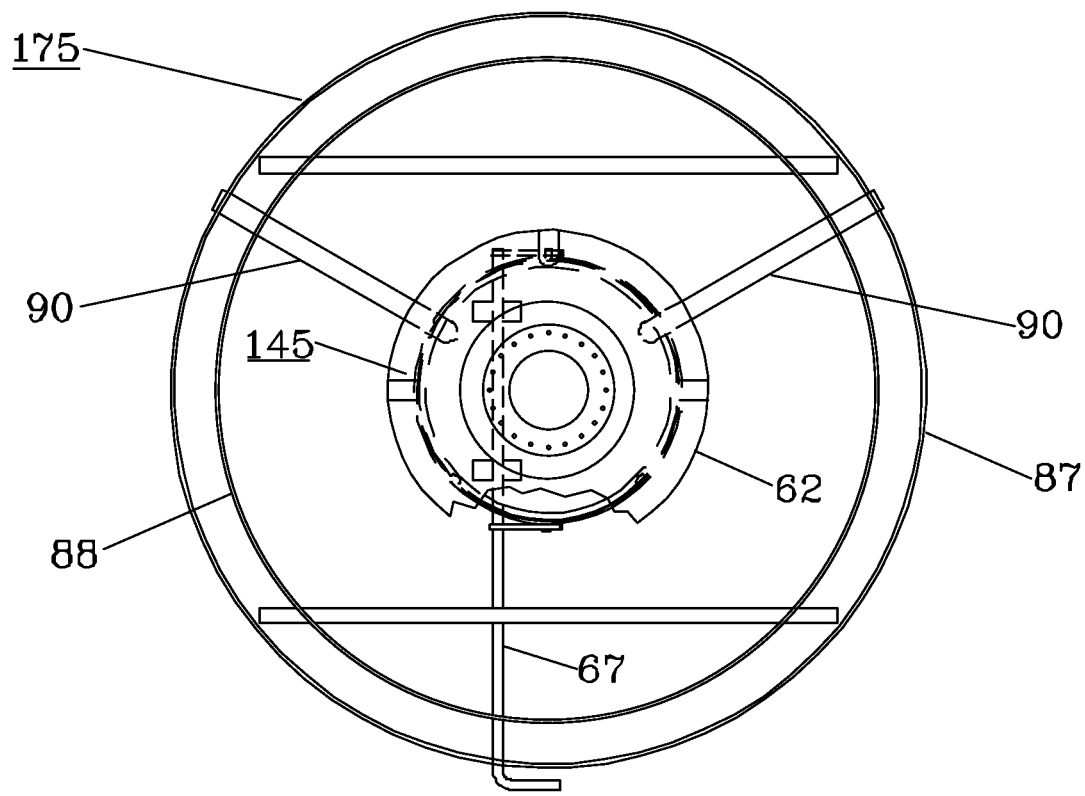
FIG. 27 shows an alternate embodiment of the assembled stove in a plan view.
Figure 28:
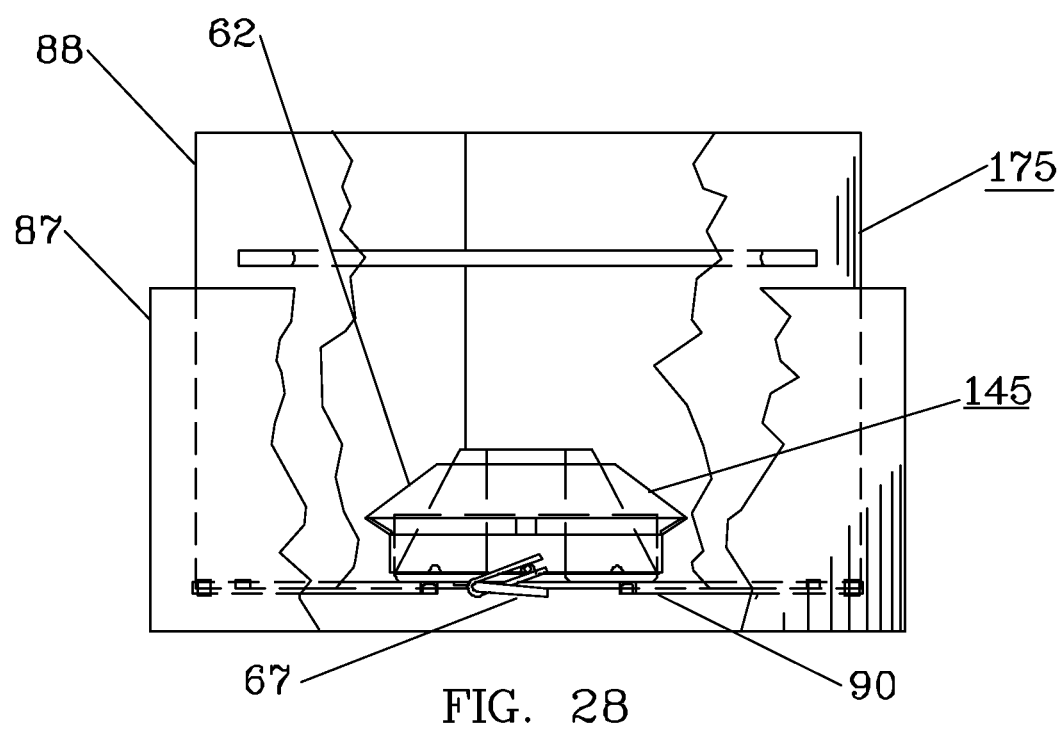
FIG. 28 shows this additional alternate embodiment of the assembled stove in a cutaway, elevation view.

FIG. 27 shows a plan view of an alternate embodiment of the cooking stove 175. FIG. 28 shows a cutaway, elevation view of the alternate embodiment of the cooking stove 175. This alternate embodiment comprises a combustion chamber 88. The combustion chamber 88 is full encircled by a cylindrical wall 87. The cylindrical wall 87 has a diameter somewhat greater than the diameter of the combustion chamber 88, such that an annular gap exists between the outside diameter of the combustion chamber 88 and the inside diameter of the cylindrical wall 87. The cylindrical wall 87 is intended to alternately sit upon a base or a supporting surface such that the bottom of the cylindrical wall 87 is fully closed and sealed off from the air. The bottom of the combustion chamber 88 is raised above the bottom above of the cylindrical wall 87, forming a gap which leaves the bottom of the combustion chamber 88 open.

The cooking stove 175 comprises the fuel vaporizer 145. The fuel vaporizer 145 is supported at the bottom of the combustion chamber 88 by means of two supports 90 and the rod 67 which pass thru openings in the cylindrical wall 87. The combustion chamber 88 sits upon the supports 90 and the rod 67. In this way the fuel vaporizer 145, the combustion chamber 88, and the cylindrical wall 87 form an integrated assembly of the cooking stove 175.

In operation, combustion air is drawn down thru the annular gap between the combustion chamber 88 and the cylindrical wall 87. This arrangement of the combustion chamber 88 and the cylindrical wall 87 creates a heat exchanger that preheats the combustion air as it is draw thru the annular gap. The preheated combustion air enters into the combustion chamber 88 thru the open bottom, where it mixes with the vaporized fuel generated by the fuel vaporizer 145 and combusts. The heat output of the stove can be adjusted by moving the obturating device 62, by means of rotating the rod 67 which is accessible on the outside of the cylindrical wall 87.

This embodiment of the stove could alternately comprise the fuel vaporizer 180 in place of the fuel vaporizer 145, and still maintain the same principles, function and operation.

It can be seen that the portable, alcohol-fueled cooking stove of the current invention is novel in that it employs a combustion chamber designed to create a controlled volume wherein the entire combustion process can be enclosed, contained and encompassed, thereby regulating and controlling the flow and mixing of the combustion air with the vaporized fuel. This combustion chamber is engineered and adapted to work in balanced synergy with a fuel vaporizer. In combination, these components operate to maintain a stoichiometric ratio of air and fuel to effect a very efficient and high temperature combustion process. This high heat output and balanced combustion also produce stable performance across a wide range of operating conditions and variations of wind and weather. This employment of a combustion chamber and a fuel vaporizer engineered as a unit operating in balanced synergy to maximize the efficiency, temperature and stability of the combustion and cooking processes is both insightful and unknown to prior art.

It can be further seen that the portable, alcohol-fueled cooking stove of the current invention is novel in that it employs a fuel vaporizer engineered to minimize the loss of energy in the fuel vaporizing process as far as practicable, while maintaining the utility of the stove. This is achieved through minimizing the external surface area and mass of the fuel vaporizer through improvements in the geometry, design and configuration of the fuel vaporizer, while providing optimized fuel capacity for convenient cooking. These improvements in the geometry, design and configuration of the fuel vaporizer produce a significant and measurable increase in the efficiency of the fuel vaporizing process. These improvements in the geometry, design and configuration of the fuel vaporizer, which produce a significant and measurable increase in the efficiency of the fuel vaporizing process, are persistently absent from the prior art.

It can be further seen that the portable, alcohol-fueled cooking stove of the current invention is novel in that it employs a combustion chamber which is provided with a plurality of air metering ports. In conjunction with these air metering ports, the combustion chamber employs an obturating device whereby various of the ports might be alternately blocked or unblocked in order to meter and regulate the volume, flow and location of the combustion air within the combustion chamber. By means of this metering, directing and regulating of the combustion air, the fuel vaporizer can be caused to be cooled, thereby reducing the rate of vapor generation and altering the flow pattern of fuel vapor. In this manner a practical, simple and effective control is achieved over the heat output, the shape and location of the cooking flame, and the overall cooking performance of the stove. This method of control causes the heat to be spread evenly throughout the top portion of the combustion chamber, resulting in a uniform cooking temperature and preventing hot spots that can scorch or burn food. This method of regulating the cooking performance of the stove by means of controlling the volume, flow and location of the combustion air, with the concatenate effect of cooling the fuel vaporizer and reducing the flow of fuel vapor, is deviceful and unique.

It can be further seen that the portable, alcohol-fueled cooking stove of the current invention is novel in that it is conceived as an integrated unit for packing and carrying. The various components of the stove nest together when packed, forming a compact, sturdy unit in the shape of a hollow cylinder, which is also proportioned to contain a fuel bottle. Being thus packed, the entire stove, including fuel, forms a tightly integrated assembly which fits in the palm of the hand and weighs only a few ounces. So efficient is this nesting of components, that when packed with a full fuel bottle the stove has over ninety percent of its volume filled. Such an efficient nesting of the various components of the stove, with the inclusion of the fuel bottle, into a single, compact and sturdy unit is inventive and imaginative.

In addition to the specific features, adaptations and forms that render the current invention both novel and an unobvious improvement over prior art, there is a further, compelling testament to the innovation of the current invention. Alcohol-fueled cooking stoves for backpacking and camping are currently available in well over a dozen forms, designs and concepts—either commercially or through published "Do-It-Yourself" instructions. The current invention exhibits a significantly higher heat output, as measured objectively by the time required to boil a given quantity of water, than any currently published performance specifications for any alcohol-fueled backpacking stove. The stove of the current invention exhibits significantly lower fuel consumption, as measured objectively by the fuel required to boil a given quantity of water, than any currently published performance specifications for any alcohol-fueled backpacking stove.

In addition to the significant and measurable improvements in heat output and fuel efficiency of the current invention when compared to other alcohol-fueled stoves known to prior art, there is a further, prevailing testament to the ingenuity and improvement of the current invention. The performance of the current invention has been tested in a variety of operating conditions against petroleum-fueled backpacking stoves. The current invention consistently meets or exceeds the overall cooking performance of petroleum-fueled stoves, as measured objectively by the total time required to cook a typical, prepackaged, two serving meal of rice. The current invention consistently meets or exceeds the fuel efficiency of petroleum-fueled stoves, as measured objectively by the gross weight of fuel required to cook a typical, prepackaged, two serving meal of rice. The current invention also exhibits superior high altitude and cold weather performance than many petroleum-fueled stoves.

It can be seen that the alternate embodiment of the fuel vaporizer is novel in that the inner, cylindrical, vaporizing chamber is fully encircled by the outer, annular, heating chamber. This configuration causes a greater amount of heat to be concentrated in the inner, cylindrical, vaporizing chamber effecting a high rate of fuel vaporization and high heat output. This adaptation of a fuel vaporizer having two, interconnected chambers whereby the inner, cylindrical, vaporizing chamber is fully encircled by the outer, annular, heating chamber enables levels of convenience, safety and performance which are unknown to prior art.

It must be noted that a superficially similar device is known to prior art. This superficially similar device is known from published specifications to produce a greater heat output when compared to other configurations of alcohol stoves known to prior art. However, the current invention differs fundamentally from the prior art and is a significant improvement over the prior art.

Whereas the current invention employs a single vessel that comprises two, interconnected chambers, the superficially similar device known to prior art employs two, separate vessels. The primary vessel is the vaporizing vessel. This vessel is substantially closed except for a plurality of small apertures and a filling port whereby the vessel is provided with fuel. This filling port is subsequently plugged and the vessel is caused to be heated, whereby the fuel inside the vessel is vaporized and escapes through the plurality of small apertures. The second vessel is employed to heat the primary, vaporizing vessel. The second vessel is in the form of a small tray or saucer. The primary, vaporizing vessel is placed in this small tray or saucer shaped vessel and fuel is poured into this tray or saucer shaped vessel. The combustion of the fuel in this tray or saucer shaped vessel provides the heat for vaporizing the fuel in the primary, vaporizing chamber.

The use of two, separate vessels causes this superficially similar device to be both inconvenient and dangerous. The need to fill two, separate vessels is cumbersome and leads to spillage of fuel. Filling the vaporizing vessel through a small filling port requires the use of a funnel or similar device. In addition, the fuel must be premeasured as the fuel level cannot be seen inside the vessel. The plug for the filling port can be lost, rendering the stove inoperable. Alternately, the vaporizing vessel may have a separate lid which must be removed for filling. This separate lid is inconvenient and cumbersome with the potential to be lost or damaged, rendering the stove inoperable. Finally, as the vaporizing vessel is substantially closed except for the plurality of small apertures, the vaporizing vessel can be overheated and present an explosion hazard.

The current invention, being a single vessel comprising two, interconnected chambers, corrects all of the above shortcomings. Fuel is conveniently poured into the open, outer, annular chamber where its level can be easily seen. Graduations may be provided on the side of the vessel to accurately display the fuel volume. No plugs, funnels or other loose pieces are required. Most important, the inner, vaporizing chamber cannot be overpressurized and cannot explode. As the inner, vaporizing chamber enjoys intercourse with the open, outer annular chamber by means of a plurality of small apertures at the base of the double wall, if the pressure in the vaporizing chamber becomes too high, it simply displaces liquid fuel and escapes harmlessly. The employment of two interconnected chambers in a single vessel, with the concomitant improvements in the convenience, utility and safety of the current invention, is a significant breakthrough.

Notwithstanding specific descriptions and details listed herein for the purposes of illustration, it must in no way be construed that these specific descriptions and details in any way limit or circumscribe the scope of the invention. Various specific ramifications of the current invention are anticipated.

It is anticipated that the combustion chamber may be made adjustable in diameter such that cooking pots of various sizes can be properly accommodated.

It is anticipated that various, alternate means may be employed for securing together the ends of the combustion chamber cylindrical wall and likewise the ends of the obturating band.

It is anticipated that the stove may be made larger.

It is anticipated that the stove may employ a windscreen or air jacket to enclose the combustion chamber, thereby providing additional protection from extremes of wind and weather.

It is anticipated that the combustion chamber may incorporate an array of dimples or ribs arranged to facilitate the centering of the cooking pot.

It is anticipated that various forms of shrouding or ducting may be employed to direct the flow of combustion air and facilitate the mixing of the combustion air and fuel vapor.

It is anticipated that the combustion chamber may employ divers means for effecting the metering and control of the combustion air flow.

It is anticipated that the stove may be made of more rigid and heavy material whereby it would be suitable for use when portability is not a primary concern.

It is anticipated that the pot supporting device may take a variety of alternate forms.

It is anticipated that the fuel vaporizer may employ divers means for effecting the vaporizing of the liquid fuel.

It is anticipated that provision might be made for supporting a larger cooking pot, frying pan, skillet, or similar cooking utensil on the stove.

Notwithstanding specific descriptions and details listed herein for the purposes of illustration, and notwithstanding various specific ramifications and embodiments listed above, it must in no way be construed that these specific descriptions, details, embodiments or ramifications in any way limit or circumscribe the scope of the invention.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A lightweight, portable cooking stove comprising the combination of:
   a fuel vaporizer supported by a supporting surface and substantially axially aligned with a combustion chamber, the combustion chamber comprising:

a wall having an upper end and a lower end, the lower end for engaging the supporting surface, the wall having a defined interior shape and comprising a first row of substantially equally spaced ports and a second row of substantially equally spaced ports, the first and second rows of ports separated by a predetermined longitudinal distance whereby the first row of ports is substantially longitudinally aligned with the fuel vaporizer and the second row of ports is above the fuel vaporizer;

an obturating device movably supported on the wall for selectively covering, at least partially, one or the other of the first row of ports or the second row of ports; and a pot support for supporting a cooking pot within the wall of the combustion chamber wherein a lower portion of the cooking pot is located within the upper end of the wall of the combustion chamber, the cooking pot having a defined exterior shape smaller than the defined interior shape of the wall of the combustion chamber to form an annular gap between the cooking pot and the combustion chamber wall;

whereby air entering the first row or the second row of ports extending through the combustion chamber wall mixes with vaporized fuel discharged from the fuel vaporizer to form a combustible mixture of fuel and air thereby producing products of combustion that engage a substantial portion of the defined exterior shape of the cooking pot and are drawn towards and exhaust through the annular gap.

2. The cooking stove according to claim 1 wherein the defined interior shape of the combustion chamber wall has a circular cross-section.

3. The cooking stove according to claim 1 wherein the defined interior shape of the combustion chamber wall is cylindrical.

4. The cooking stove according to claim 1 wherein the defined exterior shape of the cooking pot is cylindrical.

5. The cooking stove according to claim 1 wherein the pot support within the combustion chamber wall comprises at least one rod extending through orifices perforated in the upper end of the wall and supported by the wall.

6. The cooking stove according to claim 1 wherein the upper end of the combustion chamber wall further comprises at least one opening to allow for exhausting of the products of combustion.

7. The cooking stove according to claim 1 wherein the annular gap formed between the cooking pot and the combustion chamber wall is less than one-half inch at a narrowest point.

8. The cooking stove according to claim 1 wherein the annular gap formed between the cooking pot and the combustion chamber wall is approximately three-sixteenths of an inch at a narrowest point.

9. The cooking stove according to claim 1 wherein the fuel vaporizer comprises:

an outer chamber defined by a first cylinder having an upper end, a lower end, an outer surface, an inner surface, and a first imperforate bottom wall extending across the lower end;

an inner chamber defined by a second cylinder having an upper end, a lower end, an outer surface, an inner surface, and a second imperforate bottom wall extending across the lower end thereby defining an inner fuel receiving chamber;

the inner chamber axially aligned within the outer chamber;

the outer surface of the second cylinder spaced apart from the inner surface of the first cylinder to define an annularly spaced outer fuel vaporizing chamber therebetween;

a top wall extending across the upper end of the outer fuel vaporizing chamber, the top wall comprising a plurality of apertures formed therethrough at substantially equally spaced intervals around the outside surface of the first cylinder and the inside surface of the second cylinder to facilitate the passage of vaporized fuel from the outer fuel vaporizing chamber into the combustion chamber; and at least one opening extending between the inner fuel receiving chamber and the outer fuel vaporizing chamber and located adjacent to the lower end of the outer fuel vaporizing chamber.

10. The cooking stove according to claim 1 wherein the combustion chamber wall is coil formable.

11. The cooking stove according to claim 10 wherein the combustion chamber wall comprises first and second ends, the defined interior shape being formed when the first and second ends are fastened together and the wall forming a coil when the first and second ends are unfastened.

12. The cooking stove according to claim 11 wherein the wall of the combustion chamber comprises a metal sheet.

13. The cooking stove according to claim 12 wherein the metal sheet is formed of aluminum.

14. The cooking stove according to claim 10 wherein the defined interior shape of the coil formable combustion chamber wall is scalable to accommodate cooking pots of varying sizes.

* * * * *